United States Patent
Mizuno

(10) Patent No.: US 8,064,314 B2
(45) Date of Patent: Nov. 22, 2011

(54) OPTICAL HEAD AND OPTICAL DISC DEVICE

(75) Inventor: Sadao Mizuno, Osaka (JP)

(73) Assignee: Panasonic Corporation, Osaka (JP)

( * ) Notice: Subject to any disclaimer, the term of this patent is extended or adjusted under 35 U.S.C. 154(b) by 868 days.

(21) Appl. No.: 11/997,018

(22) PCT Filed: Jul. 20, 2006

(86) PCT No.: PCT/JP2006/314383
§ 371 (c)(1),
(2), (4) Date: Jan. 28, 2008

(87) PCT Pub. No.: WO2007/013346
PCT Pub. Date: Feb. 1, 2007

(65) Prior Publication Data
US 2010/0157777 A1  Jun. 24, 2010

(30) Foreign Application Priority Data
Jul. 28, 2005 (JP) ................................ 2005-218258

(51) Int. Cl.
*G11B 7/12* (2006.01)
(52) U.S. Cl. ............................................... 369/112.03
(58) Field of Classification Search ............ 369/112.01,
369/112.03, 112.05, 112.08, 112.23, 112.06,
369/112.04, 112.11, 112.12
See application file for complete search history.

(56) References Cited

U.S. PATENT DOCUMENTS

| 6,442,124 | B1 | 8/2002 | Chung et al. |
| 2003/0053223 | A1* | 3/2003 | Takeuchi et al. ............... 359/742 |
| 2003/0107979 | A1 | 6/2003 | Kim et al. |
| 2003/0185134 | A1* | 10/2003 | Kimura et al. ........... 369/112.08 |
| 2003/0227858 | A1* | 12/2003 | Komma .................... 369/112.08 |

(Continued)

FOREIGN PATENT DOCUMENTS
JP      11-296890      10/1999
(Continued)

OTHER PUBLICATIONS

International Search Report issued Aug. 15, 2006 in the International (PCT) Application No. PCT/JP2006/314383.

*Primary Examiner* — Wayne Young
*Assistant Examiner* — Thomas Alunkal
(74) *Attorney, Agent, or Firm* — Wenderoth, Lind & Ponack, L.L.P.

(57) ABSTRACT

A compact and inexpensive optical head that enables stable compatible playback and compatible recording with optical discs of different kinds with the use of a single objective lens is achieved. The order of diffracted light at which the diffraction efficiency by a diffraction element forming the objective lens becomes the maximum is set to the third order for blue light, the second order for red light, and the second order for infrared light in the inner peripheral portion of the diffraction element, and to the sixth order for blue light, the fourth order for red light, and the third order for infrared light to limit the aperture for infrared light in the intermediate peripheral portion. In the outer peripheral portion, the aperture for red light is limited by setting the order to an integer other than multiples of 3 for blue light.

24 Claims, 29 Drawing Sheets

U.S. PATENT DOCUMENTS

| | | | |
|---|---|---|---|
| 2004/0022164 A1* | 2/2004 | Nishioka et al. | 369/112.05 |
| 2004/0114254 A1* | 6/2004 | Kimura et al. | 359/719 |
| 2004/0156301 A1* | 8/2004 | Ikenaka | 369/112.17 |
| 2004/0246873 A1* | 12/2004 | Maruyama et al. | 369/112.03 |
| 2004/0264348 A1* | 12/2004 | Mimori | 369/112.05 |
| 2005/0002118 A1* | 1/2005 | Maruyama et al. | 359/719 |
| 2005/0036430 A1* | 2/2005 | Ikenaka | 369/112.05 |
| 2005/0094536 A1* | 5/2005 | Kimura | 369/112.05 |
| 2005/0152258 A1* | 7/2005 | Komma et al. | 369/112.05 |
| 2006/0146422 A1* | 7/2006 | Koike | 359/742 |

FOREIGN PATENT DOCUMENTS

| | | |
|---|---|---|
| JP | 2002-298422 | 10/2002 |
| JP | 2003-281775 | 10/2003 |
| JP | 2004-62971 | 2/2004 |
| JP | 2004-79146 | 3/2004 |
| JP | 2004-192783 | 7/2004 |
| JP | 2004-362626 | 12/2004 |
| JP | 2005-135555 | 5/2005 |

* cited by examiner

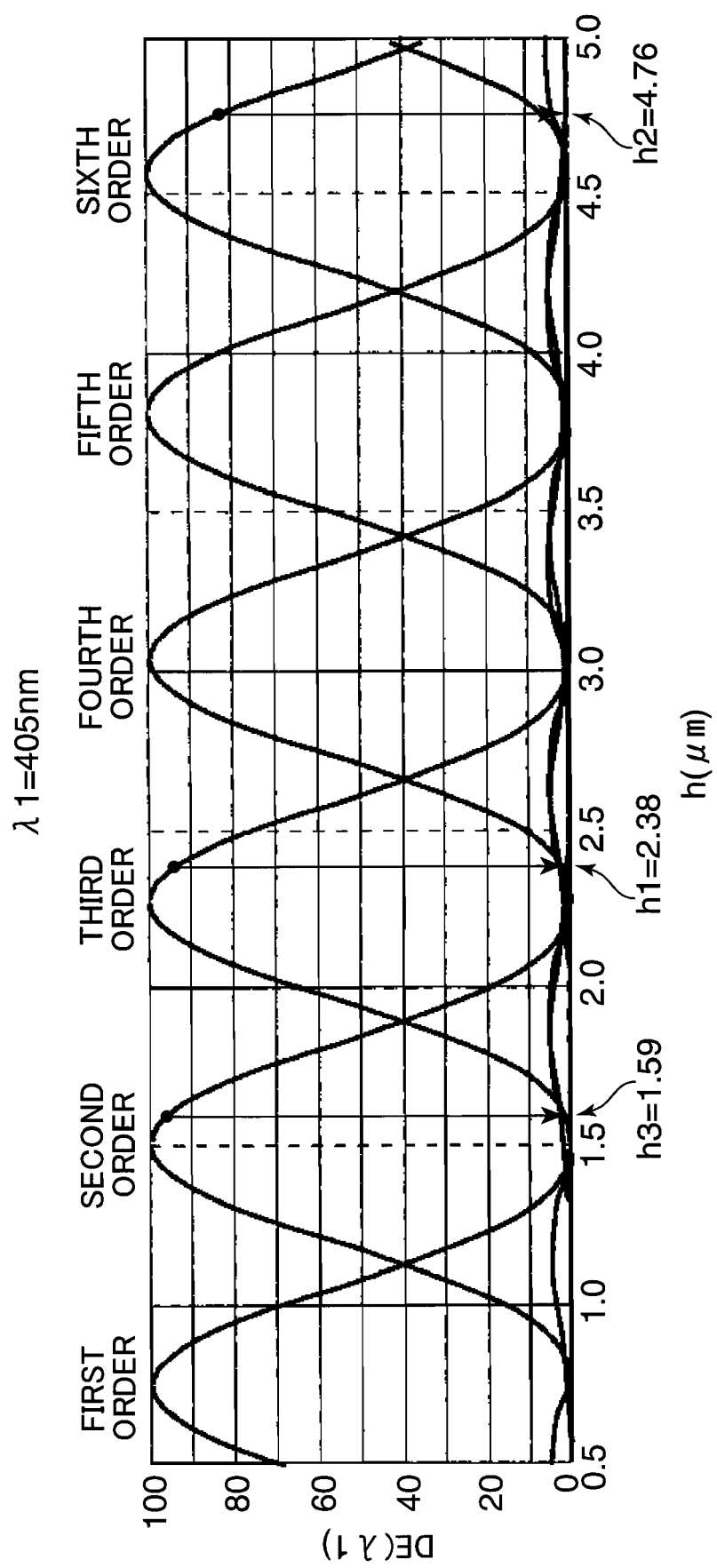

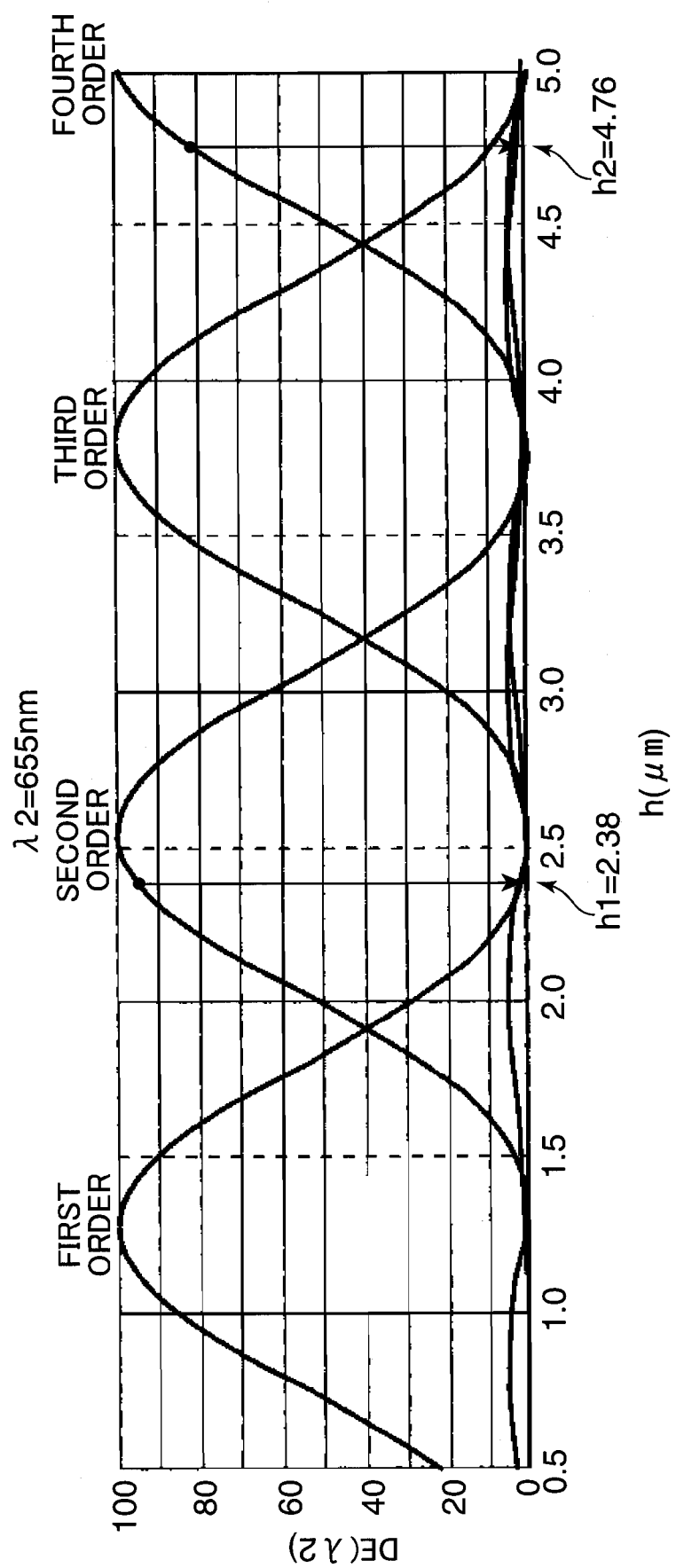

US 8,064,314 B2

OPTICAL HEAD AND OPTICAL DISC DEVICE

TECHNICAL FIELD

The present invention relates to an optical head that records, plays back, or erases information in or from an optical information storage medium, such as an optical disc, an objective lens used in the optical head, an optical disc device employing the optical head, a computer to which the optical disc device is applied, and a system, such as an optical disc recorder, that records and plays back a video/sound signal in and from an optical information storage medium using the optical disc device.

BACKGROUND ART

Regarding a compact disc (hereinafter, abbreviated to CD) deemed as the first generation of optical discs, information is recorded in or played back from (hereinafter, referred to as recorded in/played back from) an optical disc having a 1.2-mm-thick protective layer by setting the numerical aperture of the objective lens to 0.45 to 0.5 and using infrared light having a wavelength of 780 nm. In the present specification, the protective layer is defined as a transparent medium from a surface from which a light beam comes incident on an optical disc to the information recording surface. Regarding a digital versatile disc (hereinafter, abbreviate to DVD) as the second generation, information is recorded in/played back from an optical disc having a 0.6-mm-thick protective layer by setting the numerical aperture of the objective lens to 0.6 and using red light having a wavelength of 655 nm. Regarding a Blu-ray disc (hereinafter, abbreviated to BD) as the third generation, information is recorded in/played back from an optical disc having a 0.1-mm-thick protective layer by setting the numerical aperture of the objective lens to 0.85 and using blue light having a wavelength of 405 nm. Further, regarding another next generation DVD (hereinafter, referred to as HD-DVD) adopting a standard different from that of a BD, information is recorded in/played back from an optical disc having a 0.6-mm-thick protective layer, which is the thickness same as in a DVD, by setting the numerical aperture of the objective lens to 0.65 and using blue light having a wavelength of 405 nm.

An optical disc device that records/plays back information in/from, an optical disc of the third generation is configured to achieve a density higher than achieved before by employing a blue laser light source having a shorter wavelength and an optical system having a larger numerical aperture, and a widespread use in the future is expected. However, for either a BD or an HD-DVD, both of which are high density optical discs, there has been a demand to inherit assets accumulated in DVDs and CDs on one hand, and on the other hand, there has been a demand in terms of the device size for an optical disc device capable of recording/playing back information in/from different optical discs with the use of a single optical head. In order to achieve the both demands, it is necessary to provide an optical head capable of focusing a light beam to the limit of diffraction on optical discs having different protective layer thicknesses.

Conventionally, there has been proposed a configuration with the purpose of recording/playing back information in/from optical discs of different kinds using light beams having plural wavelengths. This configuration will be described using FIG. 23 and FIG. 24.

FIG. 23 is a cross section schematically showing the configuration of an example of an optical head as a first prior art. Referring to FIG. 23, a light beam 63 having a wavelength of 405 nm and emitted from a blue laser light source 61 and a light beam 64 having a wavelength of 655 nm and emitted from a red laser light source 62 are converted to parallel light by a collimator lens 65 and respectively focused by a diffraction element 66 and a refracting lens so as to be converged onto optical discs. The diffraction element 66 has a convex lens action and is configured to generate second-order diffracted light most strongly for light having a wavelength of 405 nm and to generate first-order diffracted light most strongly for light having a wavelength of 655 nm. The light beam 63 having a wavelength of 405 nm is diffracted by the diffraction element 66 and becomes second-order diffracted light, which is converged onto the information recording surface of an optical disc 51 having a 0.1-mm-thick protective layer by the refracting lens 67. Meanwhile, the light beam 64 having a wavelength 655 nm is diffracted by the diffraction element 66 and becomes first-order diffracted light, which is converged onto the information recording surface of an optical disc 52 having a 0.6-mm-thick protective layer. Light respectively reflected on the optical discs 51 and 52 is detected by a light detector 68.

FIG. 24 is an enlarged cross section of the diffraction element 66 and the refracting lens 67 shown in FIG. 23. As is shown in FIG. 24, the diffraction element 66 has different configurations in a region 66a inside the aperture for the light beam 64 and a region 66b on the outside of the region 66a. The region 66a is configured in such a manner that second-order diffracted light of the light beam 63 is converged onto the optical disc 51 and that first-order diffracted light of the light beam 64 is converged onto the optical disc 52, both via the refracting lens 67. The region 66b is configured in such a manner that second-order diffracted light of the light beam 63 is converged onto the optical disc 51 and that the first-order diffracted light of the light beam 64 has aberration with respect to the optical disc 52, both via the refracting lens 67. In this manner, spherical aberration resulting from a difference in thickness of the protective layers can be corrected (for example, see Patent Document 1).

As a second prior art, there has been proposed a configuration of an optical head compatible with optical discs of three kinds, in which a diffraction element, two wavelength-selective phase plates, and an objective lens are combined. This configuration will be described using FIG. 25.

FIG. 25 is a cross section schematically showing the configuration of an example of an optical head as a second prior art. Referring to FIG. 25, blue light 71a having a wavelength of 405 nm and emitted from an optical unit 70 becomes almost parallel light as it is diffracted by a diffraction element 72 and refracted by a concave lens 73, and is converged onto the information recording surface of an optical disc 51 having a 0.1-mm-thick protective layer after chromatic aberration of an objective lens 77 is corrected. Red light 71b having a wavelength of 655 nm and emitted from the optical unit 70 is changed to divergent light by the concave lens 73 without being affected by the diffraction element 72 and the phase thereof is corrected by a wavelength-selective phase plate 75, after which it is converged onto the information recording surface of an optical disc 52 having a 0.6-mm-thick protective layer. Further, infrared light 71c having a wavelength of 780 nm and emitted from the optical unit 70 is changed to divergent light by the concave lens 73 without being affected by the diffraction element 72 and the phase thereof is corrected by a wavelength-selective phase plate 76, after which it is converged onto the information recording surface of an optical disc 53 having a 1.2-mm-thick protective layer. Light respectively reflected on the optical disc 51, 52, and 53 travels in an inverse route to be detected by a light detector in the optical unit 70.

The wavelength-selective phase plate 75 is provided with a phase shift pattern 75a having a step-profile such that generates a phase difference for a light beam having a wavelength of 655 nm and generates a phase difference of almost an integral multiple of the corresponding wavelength for light beams having wavelengths of 405 nm and 780 nm, that is, such that makes the phase difference zero. The wavelength-selective phase plate 75 therefore gives no influence to phase distributions of the light beams 71a and 71c. The wavelength-selective phase plate 76 is provided with a phase shift pattern 76a having a step-profile such that generates a phase difference for a light beam having a wavelength of 780 nm and generates a phase difference of almost an integral multiple of the corresponding wavelength for light beams having wavelengths of 405 nm and 655 nm, that is, such that makes the phase difference zero. The wavelength-selective phase plate 76 therefore gives no influence to phase distributions of the light beams 71a and 71b.

The objective lens 77 is configured so that blue light having a wavelength of 405 nm is converged onto a BD having a 0.1-mm-thick protective layer when it comes incident thereon as parallel light, and when information is recorded in/played back from a DVD having a 0.6-mm-thick protective layer, spherical aberration is generated due to a difference in thickness. This spherical aberration is corrected with the use of the concave lens 73 and the wavelength-selective phase plate 75. Also, spherical aberration generated when information is recorded in/played back from a CD having a 1.2-mm-thick protective layer is corrected with the use of the concave lens 73 and the wavelength-selective phase plate 76 (for example, see Patent Document 2).

As a third prior art, there has been proposed a configuration to record/play back information in/from plural optical discs by mechanically switching plural objective lenses (for example, see Patent Document 3).

As a fourth prior art, there has been proposed a configuration regarding an HD-DVD to record/play back information in/from optical discs of different kinds. This configuration will be described using FIG. 26 and FIG. 27.

FIG. 26 is a cross section schematically showing the configuration of an example of an optical head as the fourth prior art. Referring to FIG. 26, a light beam 83 having a wavelength of 405 nm and emitted from a blue laser light source 80, a light beam 84 having a wavelength of 655 nm and emitted from a red laser light source 81, and a light beam 85 having a wavelength of 780 nm and emitted from an infrared laser light source 82 are focused by an objective lens 86 provided with a diffraction element 86a so as to be converged onto optical discs.

FIG. 27 is a partial enlarged cross section of the objective lens 86 shown in FIG. 26. As is shown in FIG. 27, the objective lens 86 has different configurations in an inner peripheral portion 87, an intermediate peripheral portion 88, and an outer peripheral portion 89. In other words, the diffraction element 86a is configured in such a manner that the inner peripheral portion 87 generates first-order diffracted light most strongly for light having each wavelength, the intermediate peripheral portion 88 generates third-order diffracted light most strongly for light having a wavelength of 405 nm and second-order diffracted light most strongly for light having a wavelength of 655 nm, and the outer peripheral portion 89 makes the maximum diffraction order different for light having a wavelength of 405 nm and light having a wavelength of 655 nm. Further, the refraction surface of the objective lens is configured in such a manner that the strongest diffracted light as described above is converged onto a corresponding optical disc, and aspheric surface coefficients are different in the respective inner peripheral portion 87, intermediate peripheral portion 88, and outer peripheral portion 89.

In this manner, the objective lens 86 converges light at the diffraction order that is generated most strongly by all the peripheral portions of the diffraction element 86a for the light beam 83 onto the information recording surface of an optical disc 54 having a 0.6-mm-thick protective layer, converges light at the diffraction order that is generated most strongly by the inner peripheral portion 87 and the intermediate peripheral portion 88 of the diffraction element 86a for the light beam 84 onto the information recording surface of an optical disc 52 having a 0.6-mm-thick protective layer, and converges light at the diffraction order that is generated most strongly by the inner peripheral portion 87 of the diffraction element 86a for the light beam 85 onto the information recording surface of an optical disc 53 having a 1.2-mm-thick protective layer. In this manner, by correcting spherical aberration resulting from differences in wavelength and in thickness of the protective layers and making the diffraction orders different in the respective regions of the diffraction element 86a, it is possible to limit apertures so that NA1 is given as the numerical aperture for the light beam 83, NA2 is given as the numerical aperture for the light beam 84, and NA3 is given as the numerical aperture for the light beam 85 (NA1>NA2>NA3) (for example, see Patent Document 4).

The respective prior arts described above, however, have the following problems.

In the first prior art, it is possible to record/play back information in/from a BD and a DVD with the use of a single objective lens; however, it is impossible to record/play back information in/from a CD. Because spherical aberration resulting from a difference in thickness of the protective layers between a BD and a DVD is corrected using second-order diffracted light generated in the diffraction element 66 for light having a wavelength of 405 nm and first-order diffracted light generated in the diffraction element 66 for light having a wavelength of 655 nm, it is impossible to converge light having a wavelength of 780 nm most suitably onto the information recording surface of a CD having a 1.2-mm-thick protective layer. First-order diffracted light is also generated in the diffraction element 66 for light having a wavelength of 780 nm. However, because the wavelength is almost twice as long as 405 nm, the thickness of the most suitable protective layer becomes almost as thick as the protective layer of a BD, which makes it impossible to record/play back information in/from a CD. Further, because the aperture limiting means is absent for light used for recording/playing back information in/from a CD, the numerical aperture cannot be set to 0.45. In short, this method relates to the compatibility between a BD and a DVD, and new technical means is necessary to achieve the compatibility among three wavelengths including the wavelength of light needed to record/play back information in/from a CD.

In the second prior art, the compatibility is achieved in recording/playing back information in/from a BD, a DVD, and a CD with the use of the diffraction element and the two wavelength-selective phase plates. However, because the diffraction element and the wavelength-selective phase plates are provided with the wavelength selectivity for three wavelengths, the grooves become deeper and a loss of light amount is increased by a diffraction loss on the groove inclined planes and an error of groove depths. In particular, the diffraction element 72 that diffracts blue light and does not diffract red light and infrared light is formed in a 4-step saw-teeth shape and the depth of all the steps exceeds 20 μm. This makes it impossible to secure sufficient manufacturing accuracy for a diffraction element to which the accuracy one order of magnitude smaller than the wavelength is required. In addition, because the aperture limiting means is absent for light used to record/play back information in/from a DVD and a CD, an optical filter or the like is necessary to set the numerical aperture for a DVD to 0.6 and the numerical aperture for a CD to 0.45. This configuration is a complicated configuration using an optical filter or the like in addition to a diffraction grating, a concave lens, two wavelength-selective phase plates, and an objective lens. The mass of a movable portion in the actuator that drives the optical head is consequently increased, which not only makes the driving at high double speeds for focusing and tracking difficult, but also brings disadvantages in terms of costs.

In the third prior art, because the objective lenses are switched, plural objective lenses are necessary. This poses problems that not only the number of components is increased, but also a size reduction of the optical head becomes difficult. In addition, the need for the switching mechanism makes a size reduction of the device more difficult.

In the fourth prior art, the compatibility is achieved in recording/playing back information in/from an HD-DVD, a DVD, and a CD by correcting spherical aberration and limiting the aperture with the use of the diffraction element. However, because the diffraction orders of the diffraction element are changed, when the wavelength changes from the design wavelength, the converging performance is deteriorated. The diffraction angle of the diffraction element increases as the diffraction order becomes higher and the wavelength becomes longer, and decreases as the pitch of the diffraction grating becomes longer. Hence, in a case where the diffraction orders are changed within the diffraction element, a change of the diffraction angle in response to a change of the wavelength differs from region to region, which makes it impossible to converge a light beam to a single point. A change of the wavelength is attributed to variations of the wavelengths and the temperature dependence in the light sources. The variations of the wavelengths are of the order of ±5 nm in the blue laser light source and of the order of ±10 nm in the infrared laser light source. The temperature dependence is of the order of ±2 nm in each light source. These cause a change from the design wavelength.

According to the configuration of the fourth prior art, because the diffraction order of the light beam 83 changes from the first order to the third order when the diffraction grating of the diffraction element changes from the one in the inner peripheral portion to the one in the intermediate peripheral portion, by setting the pitch of the diffraction grating in the intermediate peripheral portion to three times the pitch designed as the first-order diffracted light, it is possible to make a change of the diffraction angle in response to a change of the wavelength between the inner peripheral portion and the intermediate peripheral portion constant. However, because the diffraction order of the light beam 84 changes from the first order to the second order, a change of the diffraction angle in response to a change of the wavelength between the inner peripheral portion and the intermediate peripheral portion cannot be made constant unless the pitch of the diffraction grating in the intermediate peripheral portion is set to twice the pitch designed as the first-order diffracted light. Hence, when the diffraction orders change for the both light beams, a change of the diffraction angle cannot be made constant, which makes it impossible to converge a light beam to a single point when the wavelength changes.

In view of the foregoing, a practical compatible optical head capable of recording/playing back information in/from optical discs respectively having 0.1-mm-thick, 0.6-mm-thick, and 1.2-mm-thick protective layers using three wavelengths for blue light, red light, and infrared light has not been achieved.

Patent Document 1: JP-A-2004-192783 (pages 12-18, FIGS. 1 and 2)
Patent Document 2: JP-A-2003-281775 (pages 6-11, FIG. 1)
Patent Document 3: JP-A-11-296890 (pages 4-6, FIG. 1)
Patent Document 4: JP-A-2004-362626 (pages 5-14, FIGS. 1 and 3)

DISCLOSURE OF THE INVENTION

The invention is to solve the problems in the prior arts as discussed above, and has an object to provide a compact and inexpensive optical head that enables stable compatible playback and compatible recording among optical discs of different kinds with the use of a single objective lens.

In order to achieve the above and other objects, an optical head of the invention includes at least first, second, and third light sources, an objective lens, and a light detector. The first light source emits light having a wavelength $\lambda 1$, the second light source emits light having a wavelength $\lambda 2$, and the third light source emits light having a wavelength $\lambda 3$. The objective lens is formed of at least a diffraction element and a refracting lens, and converges the light having the wavelength $\lambda 1$ onto a first optical disc at a numerical aperture NA1, converges the light having the wavelength $\lambda 2$ onto a second optical disc at a numerical aperture NA2, and converges the light having the wavelength $\lambda 3$ onto a third optical disc at a numerical aperture NA3. Herein, the numerical apertures NA1, NA2, and NA3 are in a relation expressed as: NA1>NA2>NA3. The diffraction element is formed of a diffraction grating having a grating shape that generates third-order diffracted light most strongly for the light having the wavelength $\lambda 1$, generates second-order diffracted light most strongly for the light having the wavelength $\lambda 2$, and generates second-order diffracted light most strongly for the light having the wavelength $\lambda 3$ in a region corresponding to the numerical aperture NA3. Also, the diffraction element is formed of the diffraction grating having a grating shape that generates sixth-order diffracted light most strongly for the light having the wavelength $\lambda 1$, generates fourth-order diffracted light most strongly for the light having the wavelength $\lambda 2$, and generates third-order diffracted light most strongly for the light having the wavelength $\lambda 3$ in a region corresponding to the numerical apertures NA3 to NA2. Further, the diffraction element is formed of the diffraction grating having a grating shape that generates m-th order diffracted light most strongly for the light having the wavelength $\lambda 1$ in a region corresponding to the numerical apertures NA2 to NA1.

According to this configuration, it is possible to record/play back information in a stable manner with the use of the objective lens formed of the diffraction element and the refracting lens by forming the diffraction grating in such a manner that a change of the diffraction angle in response to a change of the wavelength becomes constant even when the diffraction orders of light are changed in plural regions where the apertures are limited by the diffraction element, thereby allowing light respectively having different wavelengths to be converged onto optical discs respectively having different protective layer thicknesses at the corresponding suitable numerical apertures. It is thus possible to achieve a compact and inexpensive optical head capable of correcting spherical aberration resulting from a difference in thickness of the protective layers with the use of a single objective lens without the need for aperture limiting means, such as an optical filter, and thereby enabling stable compatible playback and compatible recording with discs of different kinds.

BRIEF DESCRIPTION OF THE DRAWINGS

FIG. 5A is a graph plotting the diffraction efficiency of light having the wavelength $\lambda 1$ with respect to the depth (h) of a diffraction grating according to the first embodiment of the invention.

FIG. 5B is a graph plotting the diffraction efficiency of light having the wavelength $\lambda 2$ with respect to the depth (h) of the diffraction grating according to the first embodiment of the invention.

BEST MODE FOR CARRYING OUT THE INVENTION

Hereinafter, embodiments of the invention will be described with reference to the drawings.

First Embodiment

Figure 1:
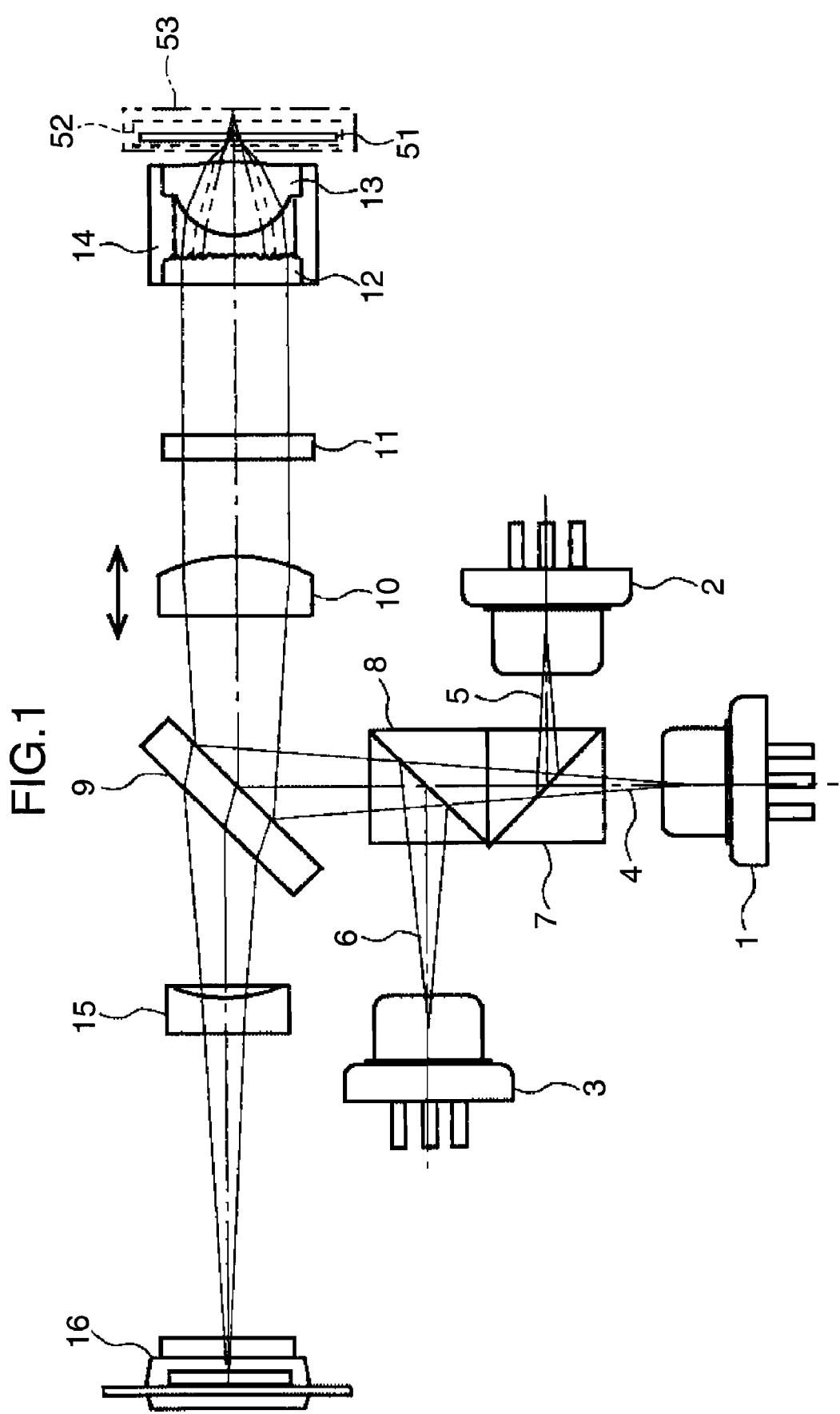
FIG. 1 is a cross section showing the overall configuration of an optical head according to a first embodiment of the invention.

FIG. 1 is a cross section showing the overall configuration of an optical head according to a first embodiment of the invention. Referring to FIG. 1, numeral 1 denotes a blue laser light source that emits light having a wavelength $\lambda 1$ (almost 405 nm), numeral 2 denotes a red laser light source that emits light having a wavelength $\lambda 2$ (almost 655 nm), and numeral 3 denotes an infrared light source that emits light having a wavelength $\lambda 3$ (almost 780 nm). Numeral 10 denotes a collimator lens and numeral 14 denotes an objective lens. The objective lens 14 is formed of a diffraction element 12 and a refracting lens 13. Numeral 51 denotes an optical disc having a protective layer thickness t1 of about 0.1 mm, and it is an optical information medium in/from which information is recorded/played back with a light beam having the wavelength $\lambda 1$ at a numerical aperture NA1, for example, an optical disc used as a BD. Numeral 52 denotes an optical disc having a protective layer thickness t2 of about 0.6 mm, and it is an optical information medium in/from which information is recorded/played back with a light beam having the wavelength $\lambda 2$ at a numerical aperture NA2, for example, an optical disc used as a DVD. Numeral 53 denotes an optical disc having a protective layer thickness t3 of about 1.2 mm, and it is an optical information medium in/from which information is recorded/played back with a light beam having the wavelength $\lambda 3$ at a numerical aperture NA3, for example, an optical disc used as a CD. For these optical discs, the numerical apertures NA1 is 0.85, NA2 is 0.6, and NA3 is 0.45 to 0.5. In FIG. 1, the protective layers alone from the surface on which a light beam comes incident to the information recording surface are shown as the optical discs 51 (solid line), 52 (broken line), and 53 (alternate long and short dashed line). In practice, in order to ensure the mechanical strength and make the outer shape same as the 1.2-mm-thick outer shape of a CD, base materials are laminated to the optical discs 51 and 52. A base material having a thickness of 0.6 mm is laminated to the optical disc 52 and a base material having a thickness of 1.1 mm is laminated to the optical disc 51. The base substrates, however, are omitted in FIG. 1 for ease of illustration.

When information is recorded in/played back from the optical disc 51 having a high recording density, a light beam 4 having the wavelength $\lambda 1$ and emitted from the blue laser light source 1 passes through a prism 7 and a prism 8 to go incident on a beam splitter 9. The prism 7 is configured to transmit light having the wavelength $\lambda 1$ and to reflect light having the wavelength $\lambda 2$. The prism 8 is configured to transmit light respectively having the wavelengths $\lambda 1$ and $\lambda 2$ and to reflect light having the wavelength $\lambda 3$. The beam splitter 9 functions as an optical path branching element having a polarization split characteristic to reflect linear polarized light in one direction and to transmit linear polarized light in a direction at right angles with the firstly mentioned direction for light respectively having the wavelengths $\lambda 1$ and $\lambda 2$, and having a half mirror characteristic to transmit a part of light and reflect another part of light for light having the wavelength $\lambda 3$.

The polarization direction of the light beam 4 emitted from the blue laser light source 1 is set so as to be reflected on the beam splitter 9. The light beam 4 reflected thereon is collected by the collimator lens 10 to become almost parallel light and is converted to circular polarized light from linear polarized light by a wavelength plate 11. The wavelength plate 11 is configured to act as a ¼ wavelength plate for light respectively having the wavelengths $\lambda 1$ and $\lambda 2$ and not to act as a wavelength plate for light having the wavelength $\lambda 3$. Further, the light beam is focused by the objective lens 14 formed of the diffraction element 12 and the refracting lens 13 so as to be converged onto the information recording surface of the optical disc 51 via the protective layer having thickness t1.

The light beam 4 reflected on the information recording surface of the optical disc 51 travels inversely in the optical path it has traveled to be converted to linear polarized light in a direction at right angles with the outward path by the wavelength plate 11 and passes through the beam splitter 9. The light beam 4, which is changed to converged light by the collimator lens 10, is provided with astigmatism by passing through the beam splitter 9, and goes incident on a light detector 16 after the optical magnification thereof is converted by a detection lens 15. By applying computation to an output signal from the light detector 16, a servo signal including a focus error signal used for the focus control and a tracking error signal used for the tracking control as well as an information signal of image and sound information are obtained. The focus error signal is obtained, for example, by the astigmatic method and the tracking error signal is obtained, for example, by the push-pull method.

When information is recorded in/played back from the optical disc 52, a light beam 5 having the wavelength $\lambda 2$ emitted from the red laser light source 2 is reflected on the prism 7 and passes through the prism 8 to go incident on the beam splitter 9. The polarization direction of the light beam 5 emitted from the red laser light source 2 is set so as to be reflected on the beam splitter 9. The light beam 5 reflected thereon is collected by the collimator lens 10 and becomes almost parallel light, which is converted to circular polarized light from linear polarized light by the wavelength plate 11. Further, the light beam 5 is focused by the objective lens 14 formed of the diffraction element 12 and the refracting lens 13 so as to be converged onto the information recording surface of the optical disc 52 via the protective layer having thickness t2.

The light beam 5 reflected on the information recording surface of the optical disc 52 travels inversely in the optical path it has traveled to be converted to linear polarized light in a direction at right angles with the outward path by the wavelength plate 11 and passes through the beam splitter 9. The light beam 5, which is changed to converged light by the collimator lens 10, is provided with astigmatism by passing through the beam splitter 9 and goes incident on the light detector 16 after the optical magnification thereof is converted by the detection lens 15. By applying computation to an output signal from the light detector 16, a servo signal including a focus error signal used for the focus control and a tracking error signal used for the tracking control as well as an information signal of image and sound information are obtained.

When information is recorded in/played back from the optical disc 53, a light beam 6 having the wavelength $\lambda 3$ emitted from the infrared light source 3 is reflected on the prism 8 and goes incident on the beam splitter 9. A part of the light beam 6 emitted from the infrared laser light source 3 is reflected on the beam splitter 9 and is collected by the collimator lens 10 to become almost parallel light that passes through the wavelength plate 11. Further, the light beam 6 is focused by the objective lens 14 formed of the diffraction element 12 and the refracting lens 13 so as to be converged onto the information recording surface of the optical disc 53 via the protective layer having thickness t3.

The light beam 6 reflected on the information recording surface of the optical disc 53 travels inversely in the optical path it has traveled and passes the wavelength plate 11 and the collimator lens 10, and the beam splitter 9 transmits a part of the light beam 6. The light beam 6, which is changed to converged light by the collimator lens 10, is provided with astigmatism by passing through the beam splitter 9 and goes incident on the light detector 16 after the optical magnification thereof is converted by the detection lens 15. By applying computation to an output signal from the light detector 16, a servo signal including a focus error signal used for the focus control and a tracking error signal used for the tracking control as well as an information signal of image and sound information are obtained.

The optical disc 53 used as a CD includes those having large double refraction, and light may fail to propagate to the light detector 16 when the optical path is branched by polarization split as with the light beams 4 and 5. It is therefore preferable for the light beam 6 to branch the optical path by the half mirror characteristic to reflect a certain amount of light and to transmit another certain amount of light regardless of the polarization direction.

Figure 2:
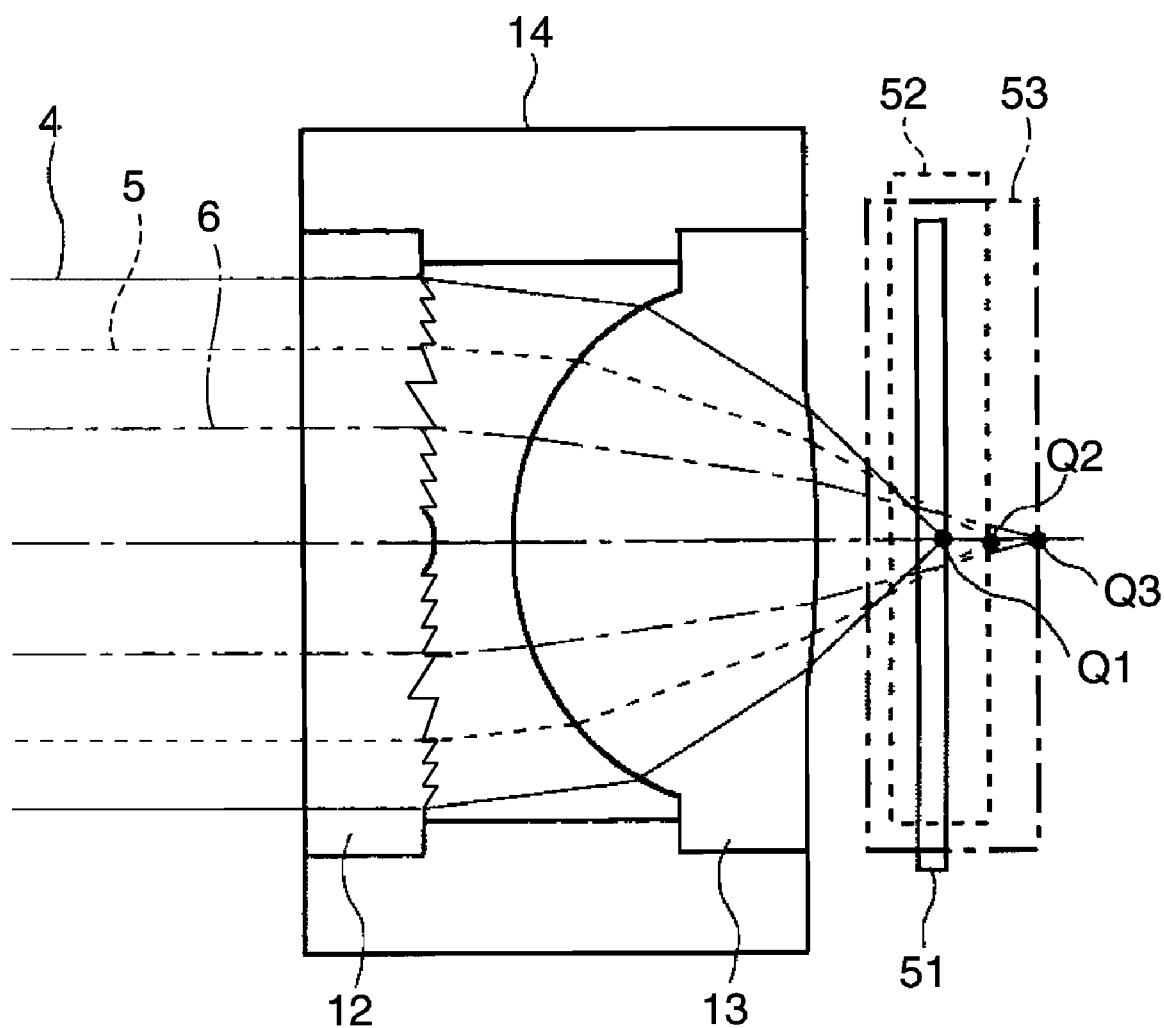
FIG. 2 is an enlarged cross section showing an example of an objective lens according to the first embodiment of the invention.

The operations and the configurations of the diffraction element 12 and the refracting lens 13 will now be described with reference to FIG. 2 through FIG. 5. FIG. 2 is an enlarged cross section showing an example of the objective lens 14 according to the first embodiment of the invention to show propagation of light converged by the diffraction element 12 and the refracting lens 13 that together form the objective lens 14. Referring to FIG. 2, the diffraction element 12 diffracts the light beams 4, 5, and 6 to exert the convex lens action. The refracting lens is configured to converge the light beam 4 having undergone the diffraction action exerted by the diffraction element 12 onto the recording surface of the optical disc 51 via the protective layer having thickness t1, and, by exploiting a difference of the diffraction actions resulting from a difference of the wavelengths, to converge the light beam 5 onto the recording surface of the optical disc 52 via the protective layer having thickness t2 and to converge the light beam 6 onto the recording surface of the optical disc 53 via the protective layer having thickness t3.

Referring to FIG. 2, the light beam 4 propagates in an optical path indicated by a solid line and is converged to a point Q1, the light beam 5 propagates in an optical path indicated by a broken line and is converged to a point Q2, and the light beam 6 propagates in an optical path indicated by an alternate long and short dashed line and is converged to a point Q3. In this manner, the light beams 4, 5, and 6 are subjected to wave front conversion by the diffraction element 12 and spherical aberration resulting from a difference in thickness of the protective layers is corrected.

The diffraction angle θ of light diffracted by the diffraction element 12 decreases as the pitch of the diffraction grating becomes longer whereas it increases as the wavelength becomes longer and the diffraction order becomes higher. Further, the diffraction order becomes higher as the depth of the diffraction grating increases. Hence, the embodiment of the invention is configured in such a manner that the converging positions of the light beams 4, 5, and 6 will not be displaced even when the wavelength changes by correcting spherical aberration resulting from a difference in thickness of the protective layers and limiting the apertures to the numerical aperture NA2 for light having the wavelength λ2 and to the numerical aperture NA3 for light having the wavelength λ3 by exploiting the diffraction order and the pitch of the diffraction grating.

Figure 3:
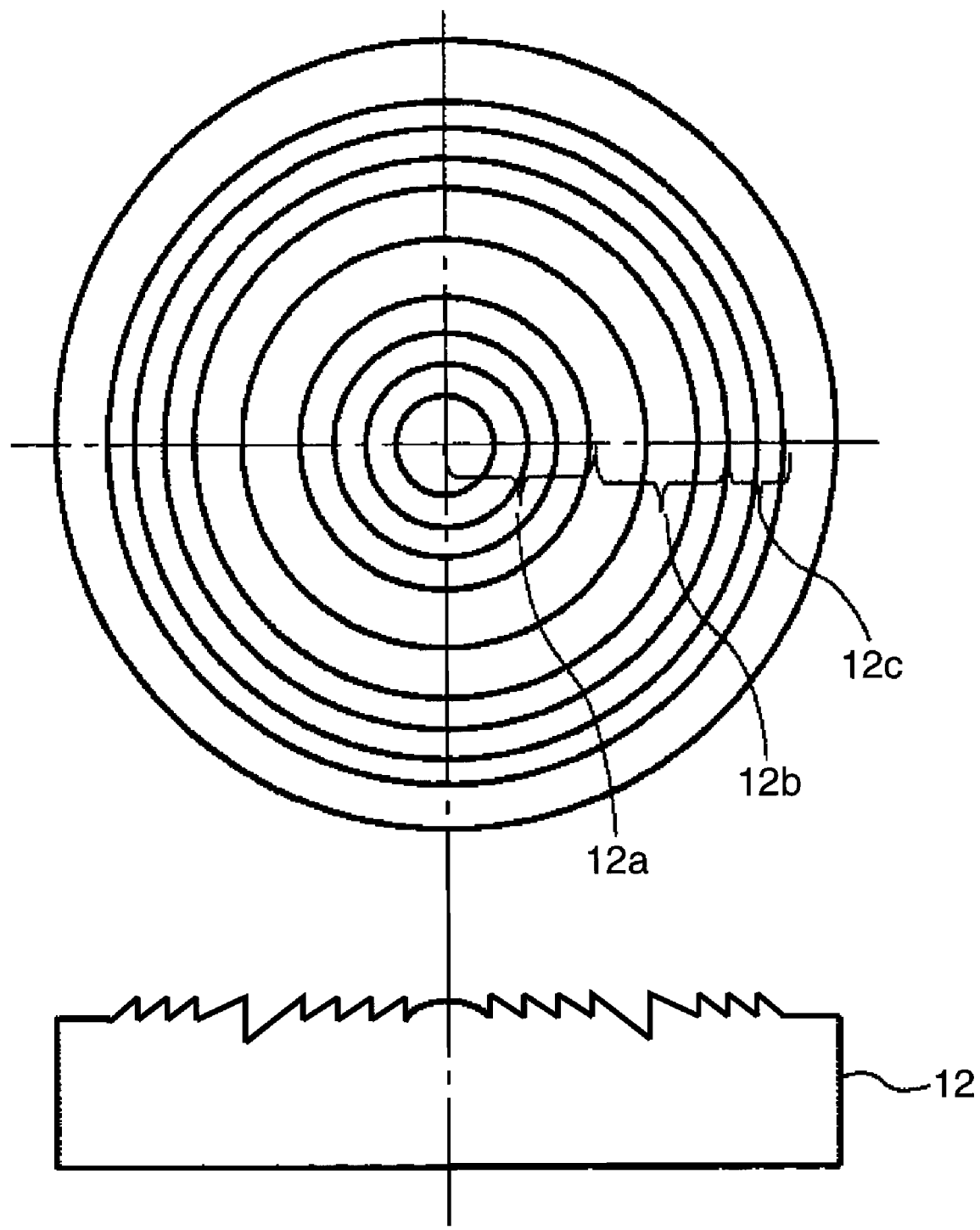
FIG. 3 is a view showing a plane (the upper side on the sheet surface) and a cross section (the lower side on the sheet surface) of a diffraction element according to the first embodiment of the invention.

FIG. 3 is a view showing the plane (the upper side on the sheet surface) and the cross section (the lower side on the sheet surface) of the diffraction element 12. As is shown in FIG. 3, the diffraction grating of the diffraction element 12 forms a concentric shape and has different configurations in an inner peripheral portion 12a, an intermediate peripheral portion 12b, and an outer peripheral portion 12c.

The inner peripheral portion 12a of the diffraction element 12 is a portion corresponding to the numerical aperture NA3 and has a grating shape that generates third-order diffracted light most strongly for the light beam 4 having the wavelength λ1, generates second-order diffracted light most strongly for the light beam 5 having the wavelength λ2, and generates second-order diffracted light most strongly for the light beam 6 having the wavelength of λ3. The third-order diffracted light of the light beam 4 is converged onto the optical disc 51 via the refracting lens 13. The second-order diffracted light of the light beam 5 is converged onto the optical disc 52 via the refracting lens 13. The second-order diffracted light of the light beam 6 is converged onto the optical disc 53 via the refracting lens 13.

The intermediate peripheral portion 12b of the diffraction element 12 is a portion corresponding to the numerical apertures NA3 to NA2 and has a grating shape that generates sixth-order diffracted light most strongly for the light beam 4 having the wavelength λ1, generates fourth-order diffracted light most strongly for the light beam 5 having the wavelength λ2, and generates third-order diffracted light most strongly while hardly generating fourth-order diffracted light for the light beam 6 having the wavelength λ3. The sixth-order diffracted light of the light beam 4 is converged onto the optical disc 51 via the refracting lens 13. The fourth-order diffracted light of the light beam 5 is converged onto the optical disc 52 via the refracting lens 13.

The outer peripheral portion 12c of the diffraction element 12 is a portion corresponding to the numerical apertures NA2 to NA1 and has a grating shape that generates m-th order (m is an integer other than multiples of 3, for example, 2) diffracted light most strongly for the light beam 4 having the wavelength λ1, and this second-order diffracted light is converged onto the optical disc 51 via the refracting lens 13.

Figure 4:
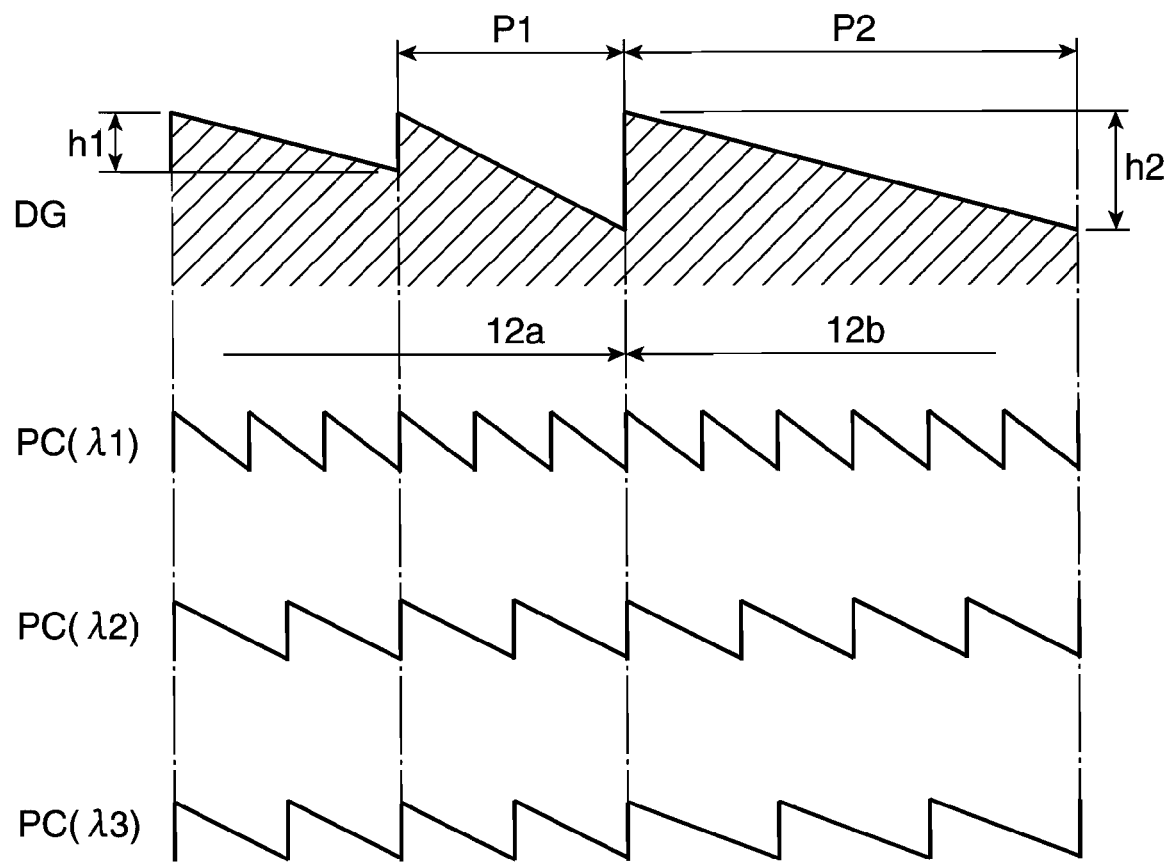
FIG. 4 is a view showing a physical cross sectional shape (DG) of the diffraction element according to the first embodiment of the invention and phase changes ($PC(\lambda 1)$, $PC(\lambda 2)$, and $PC(\lambda 3)$) of light respectively having wavelengths $\lambda 1$, $\lambda 2$, and $\lambda 3$ and passing through the diffraction element.

The operation of the diffraction element 12 will now be described in detail using FIG. 4 and FIG. 5A, FIG. 5B, and FIG. 5C. FIG. 4 is a view showing the physical cross sectional shape of the diffraction grating forming the diffraction element 12 and phase changes in response to the respective wavelengths. Referring to FIG. 4, DG represents the physical cross sectional shape of the diffraction grating, PC(λ1) represents a phase change of light having the wavelength λ1 and passing through the diffraction grating, PC(λ2) represents a phase change of light having the wavelength λ2 and passing through the diffraction grating, and PC(λ3) represents a phase change of light having the wavelength λ3 and passing through the diffraction grating. The physical cross sectional shape DG shows the boundary region between the inner peripheral portion 12a and the intermediate peripheral portion 12b by way of example, and the diffraction grating has a saw-teeth cross sectional shape to allow particular diffracted light to be generated efficiently.

Figure 5C:
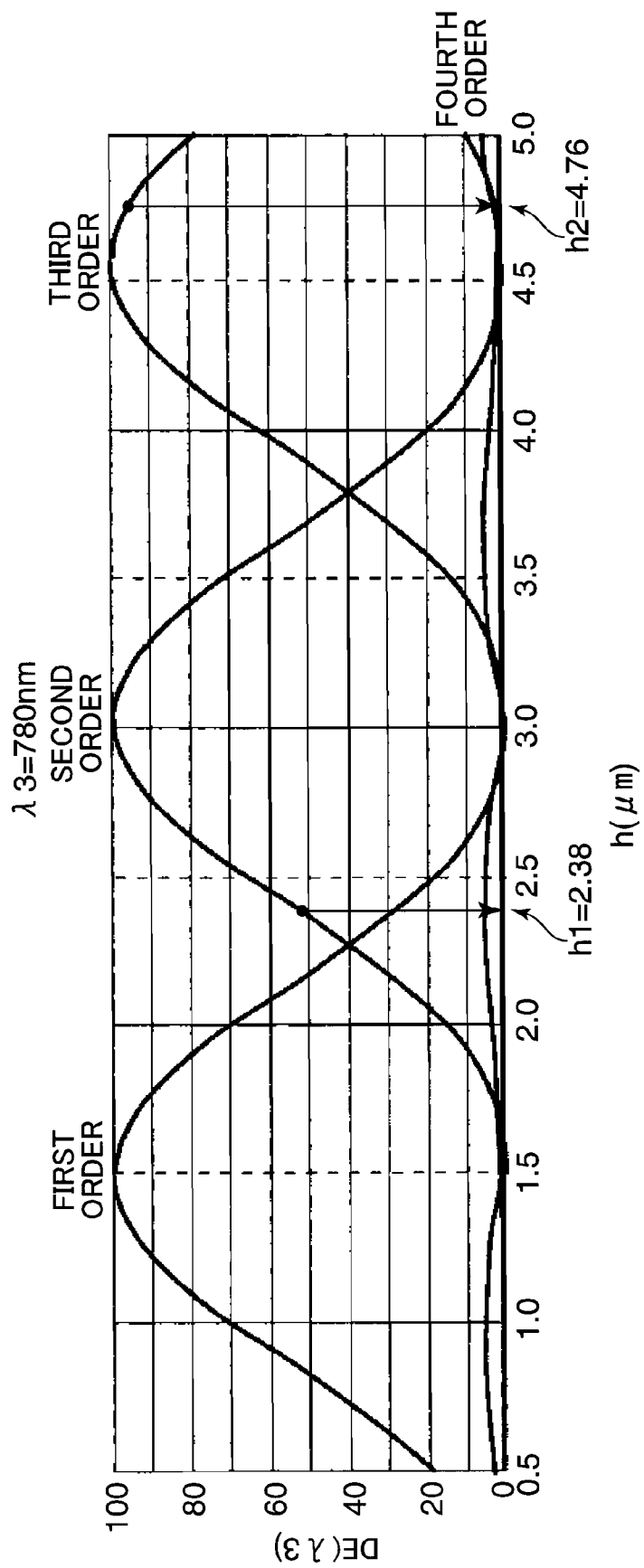
FIG. 5C is a graph plotting the diffraction efficiency of light having the wavelength $\lambda 3$ with respect to the depth (h) of the diffraction grating according to the first embodiment of the invention.

FIG. 5A through FIG. 5C are graphs showing the diffraction efficiency DE with respect to the depth h of the saw-teeth grating when the diffraction element 12 is made of a material, for example, borosilicate crown glass (BK7). FIG. 5A shows the depth h and the diffraction efficiency DE(λ1) of the diffraction grating with respect to light having the wavelength λ1. FIG. 5B shows the depth h and the diffraction efficiency DE(λ2) of the diffraction grating with respect to light having the wavelength λ2. FIG. 5C shows the depth h and the diffraction efficiency DE(λ3) of the diffraction grating with respect to light having the wavelength λ3. Herein, assume that a difference of the optical path lengths is a difference of the optical path lengths resulting from the absence or presence of steps in the diffraction grating. Given n as the refraction factor with respect to the wavelength λ, then, a difference L of the optical path lengths can be expressed as the product of the depth h of the step and a difference of refraction factors between the medium and air, (n−1), as follows:

$$L = h \times (n-1).$$

Given that the difference L of the optical path lengths is k times the wavelength, then, the depth h is expressed as:

$$h = k \times \lambda / (n-1)$$

In the inner peripheral portion 12a, as is shown in FIG. 4, the depth h1 of the diffraction grating is set, for example, to 2.38 μm. When the wavelength λ1 is 405 nm, the refraction factor n1 of BK7 is 1.5302, and by substituting h1, λ1, and n1 for h, λ, and n in Equation (1) above, k is found to be 3.12. Hence, a difference of the optical path lengths generated in the light beam 4 due to the step h1 is about 3.12 wavelengths, that is, the phase difference is about 6.23π radians. Accordingly, the intensity of the third-order diffracted light becomes the maximum for the light beam 4, and the phase change is indicated as PC(λ1) in FIG. 4. As is shown in FIG. 5A, the diffraction efficiency DE(λ1) found by the scalar computation is about 96%.

Also, when the wavelength λ2 is 655 nm, the refraction factor n2 of BK7 is 1.5144, and by substituting h1, λ2, and n2 for h, λ, and n in Equation (1) above, k is found to be 1.87. Hence, a difference of the optical path lengths generated in the light beam 5 due to the step h1 is about 1.87 wavelengths, that is, the phase difference is about 3.74π radians. Accordingly, the intensity of the second-order diffracted light becomes the maximum for the light beam 5, and the phase change is indicated as PC(λ2) in FIG. 4. As is shown in FIG. 5B, the diffraction efficiency DE(λ2) found by the scalar computation is about 94%.

Further, when the wavelength λ3 is 780 nm, the refraction factor n3 of BK7 is 1.5112, and by substituting h1, λ3, and n3 for h, λ, and n in Equation (1) above, k3 is found to be 1.56. Hence, a difference of the optical path lengths generated in the light beam 5 due to the step h1 is about 1.56 wavelengths, that is, the phase difference is about 3.12π radians. Accordingly, the intensity of the second-order diffracted light becomes the maximum for the light beam 6, and the phase change is indicated as PC(λ3) in FIG. 4. As is shown in FIG. 5C, the diffraction efficiency DE(λ3) found by the scalar computation is about 50%.

Next, in the intermediate peripheral portion 12b of the diffraction element 12, as is shown in FIG. 4, the depth h2 of the diffraction grating is set, for example, to 4.76 μm, which is twice the depth h1 of the diffraction grating in the inner peripheral portion 12a. When the wavelength λ1 is 405 nm, the refraction factor n1 of BK7 is 1.5302, and by substituting h2, λ1, and n1 for h, λ, and n in Equation (1) above, a difference of the optical path lengths generated in the light beam 4 due to the step h2 is found to be about 6.23 wavelengths, that is, the phase difference is about 12.46π radians. Accordingly, the intensity of the sixth-order diffracted light becomes the maximum for the light beam 4, and the phase change is indicated as PC(λ1) in FIG. 4. As is shown in FIG. 5A, the diffraction efficiency DE(λ1) found by the scalar computation is about 82%.

Also, when the wavelength λ2 is 655 nm, the refraction factor n2 of BK7 is 1.5144, and by substituting h2, λ2, and n2 for h, λ, and n in Equation (1) above, a difference of the optical path lengths generated in the light beam 5 due to the step h2 is found to be about 3.74 wavelengths, that is, the phase difference is about 7.487π radians. Accordingly, the intensity of the fourth-order diffracted light becomes the maximum for the light beam 5, and the phase change is indicated as PC(λ2) in FIG. 4. As is shown in FIG. 5B, the diffraction efficiency DE(λ2) found by the scalar computation is about 82%.

Further, when the wavelength λ3 is 780 nm, the refraction factor n3 of BK7 is 1.5112, and by substituting h2, λ3, and n3 for h, λ, and n in Equation (1) above, a difference of the optical path lengths generated in the light beam 6 due to the step h2 is found to be about 3.12 wavelengths. Hence, according to this shape, the intensity of the third-order diffracted light becomes the maximum for the light beam 6, and as is shown in FIG. 5C, the diffraction efficiency DE(λ3) found by the scalar computation is about 95%. Hence, the fourth-order diffracted light is hardly generated for the light beam 6, and the phase change is indicated as PC(λ3) in FIG. 4.

As has been described, the diffraction element 12 is able to change the diffraction orders by changing the depth of the diffraction grating. Incidentally, let q be the diffraction order, then the diffraction angle θ is expressed as follows:

$$\sin\theta = q \times \lambda / P \qquad (2).$$

More specifically, when the diffraction order q becomes higher, a change of the diffraction angle θ in response to a change of the wavelength λ becomes larger, and when the wavelength λ changes, the position at which light is converged onto the optical disc is displaced. In the embodiment of the invention, the pitch P of the diffraction grating is set so as to prevent the occurrence of such displacement, and a change of the diffraction angle θ in response to a change of the wavelength λ is made constant.

In the intermediate peripheral portion 12b, the depth h2 of the diffraction grating becomes twice the depth h1 of the diffraction grating in the inner peripheral portion 12a. Hence, the light beam 4 to be converged onto the optical disc 51 undergoes a change to double the diffraction order from the third-order diffraction light to the sixth-order diffraction light from the inner peripheral portion 12a to the intermediate peripheral portion 12b. However, by setting the pitch P2 of the diffraction grating in the intermediate peripheral portion 12b to twice the pitch designed as the third-order diffraction light, the diffraction angle θ in Equation (2) above becomes equal to the diffraction angle θ designed as the third-order diffracted light. A change of the diffraction angle in response to a change of the wavelength therefore becomes the same as the change in the inner peripheral portion 12a.

The light beam 5 to be converged onto the optical disc 52 undergoes a change to double the diffraction order from the second-order diffracted light to the fourth-order diffracted light from the inner peripheral portion 12a to the intermediate peripheral portion 12b. However, because the pitch P2 of the diffraction grating becomes twice the pitch designed as the second-order diffracted light and the diffraction angle θ becomes equal to the diffraction angle θ designed as the second-order diffracted light. A change of the diffraction angle in response to a change of the wavelength therefore becomes the same as the change in the inner peripheral portion 12a.

The manner in which the foregoing occurs will be described in the boundary region between the inner peripheral portion 12a and the intermediate portion 12b in the DG of FIG. 4. In the intermediate peripheral portion 12b, the depth of the diffraction grating is doubled to h2 from h1, and the pitch P of the diffraction grating is doubled to twice the pitch designed as the third-order diffracted light of the light beam 4. Herein, by making the pitch P2 twice the pitch P1 of the adjacent diffraction grating, the diffraction angles θ become equal. Hence, even when the wavelength λ1 of the light beam 4 changes, the diffraction angle changes in the same manner, which allows the diffracted light to be converged to a single point.

In addition, because the pitch P2 of the diffraction grating in the intermediate peripheral portion 12b is twice the pitch designed as the second-order diffracted light of the light beam 5, even when the wavelength λ2 of the light beam 5 changes, the diffraction angle changes in the same manner, which allows the diffracted light to be converged to a single point. In practice, because the diffraction angle θ of the diffraction element 12 is not constant and it continuously changes to have the convex lens action, the pitch P changes continuously as well. Nevertheless, the pitch P2 of the adjacent diffraction grating in the boundary region becomes almost twice the pitch P1.

Meanwhile, when the depth h2 of the diffraction grating in the intermediate peripheral portion 12b becomes 4.76 μm, as is shown in FIG. 5C, the light beam 6 having the wavelength λ3 hardly generates the fourth-order diffracted light and becomes the third-order diffracted light. The order of the third-order diffracted light is 3/2 times higher than the order in the inner peripheral portion 12a, and the pitch P becomes twice the pitch designed as the second-order diffracted light. Hence, according to Equation (2) above, the diffraction angle θ decreases, and the light beam 6 diffracted in the intermediate peripheral portion 12b is not converged at the same position as the light beam 6 diffracted in the inner peripheral portion 12a. In other words, the light beam 6 diffracted in the intermediate peripheral portion 12b is not converged onto the optical disc 53, which makes it possible to limit the aperture. Hence, by setting the inner peripheral portion 12a to a size comparable to the numerical aperture NA3, the light beam 6 is converged onto the optical disc 53 at the numerical aperture NA3.

In the outer peripheral portion 12c of the diffraction element 12, the depth h3 of the diffraction grating is set to m/3 times the depth h1 of the diffraction grating in the inner peripheral portion, for example, to 1.59 µm, which is ⅔ times the depth h1. When the wavelength λ1 is 405 nm, the refraction factor n1 of BK7 is 1.5302, and by substituting h3, λ1, and n1 for h, λ, and n in Equation (1) above, a difference of the optical path lengths generated in the light beam 4 due to the step h3 is about 2.08 wavelengths, that is, the phase difference is about 4.16π radians. Accordingly, the intensity of the second-order diffracted light becomes the maximum for the light beam 4, and as is shown in FIG. 5A, the diffraction efficiency found by the scalar computation is about 99%.

As has been described, by setting the depth h3 of the diffraction grating in the outer peripheral portion 12c to ⅔ times the depth h1 of the diffraction grating in the inner peripheral portion 12a, the light beam 4 to be converged onto the optical disc 51 undergoes a change that the diffraction order is increased by ⅔ times from the third-order diffracted light to the second-order diffracted light with respect to the inner peripheral portion 12a. As in the same manner as described above, the pitch P of the diffraction grating of the outer peripheral portion 12c is set to ⅔ times the pitch designed as the third-order diffracted light, so that a change of the diffraction angle in response to a change of the wavelength remains constant even when the diffraction order has changed. Accordingly, the diffraction angle δ in Equation (2) above becomes equal to the diffraction angle θ designed as the third-order diffracted light, which makes a change of the diffraction angle in response to a change of the wavelength same as the change in the inner peripheral portion 12a. A change of the diffraction angle in response to a change of the wavelength is thus made constant and the position on the optical disc at which the light is converged will not be displaced.

Meanwhile, for the light beam 5 having the wavelength λ2 and the light beam 6 having the wavelength λ3, the order corresponding to ⅔ of the second-order diffraction is absent when the depth h3 of the diffraction grating in the outer peripheral portion 12c becomes ⅔ of the depth h1 of the diffraction grating in the inner peripheral portion 12a, diffracted light to be converged at the same position as the diffracted light in the inner peripheral portion 12a is no longer present, which makes it possible to limit the apertures. Hence, by setting the intermediate peripheral portion 12b to a size comparable to the numerical aperture NA2, the light beam 5 is converged onto the optical disc 52 at the numerical aperture NA2. Likewise, the diffracted light to be converged onto the optical disc 53 is no longer present for the light beam 6, which makes it possible to limit the aperture in the outer peripheral portion 12c, too.

In this manner, the largest numerical aperture NA1 is set for the light beam 4 having the wavelength λ1, so that the third-order, the sixth-order, and the second-order diffracted light thereof are converged onto the optical disc 51, respectively, in the inner peripheral portion 12a, the intermediate peripheral portion 12b, and the outer peripheral portion 12c of the diffraction element 12. The numerical aperture NA2 is set for the light beam 5 having the wavelength λ2, so that the second-order and the fourth-order diffracted light thereof are converged onto the optical disc 52, respectively, in the inner peripheral portion 12a and the intermediate peripheral portion 12b while diffracted light from the outer peripheral portion 12c is inhibited from being converged onto the optical disc 52. The numerical aperture NA3 is set for the light beam 6 having the wavelength λ3, so that the generation of the fourth-order diffracted light in the intermediate peripheral portion 12b is suppressed by allowing the second-order diffracted light from the inner peripheral portion 12a to be converged onto the optical disc 53 while the diffracted light from the outer peripheral portion 12c is inhibited from being converged onto the optical disc 53. It is thus possible to achieve a most suitable relation of the numerical apertures for the respective optical discs, that is, NA1>NA2>NA3.

In the description above, the second-order diffracted light of the light beam 4 having the wavelength λ1 is used in the outer peripheral portion 12c of the diffraction element 12. However, diffracted light at the other diffraction orders can be used as well. Let m be the diffraction order of the light beam 4 in this region, then both the light beam 5 and the light beam 6 are converged at positions different from those of the diffracted light in the inner peripheral portion 12a and the intermediate peripheral portion 12b unless m/3, which is a ratio with respect to the diffraction order in the inner peripheral portion 12a, becomes an integer. In other words, by setting the diffraction order m to an integer other than multiples of 3, the light beam 5 has no diffracted light to be converged onto the optical disc 52 and the light beam 6 has no diffracted light to be converged onto the optical disc 53, which makes it possible to limit the apertures.

In the configuration described above, each of the light beams 4, 5, and 6 is subjected to wave front conversion by the diffraction element 12. Hence, in the presence of an error in the relative positions of the diffraction element 12 and the refracting lens 13, the wave front does not go incident on the refracting lens 13 as designed, which gives rise to aberration to the wave front of light respectively going incident on the optical discs 51, 52, and 53. The converging performance is thus deteriorated. It is therefore preferable to form the diffraction element 12 and the refracting lens 13 integrally as a single piece.

Figure 6:
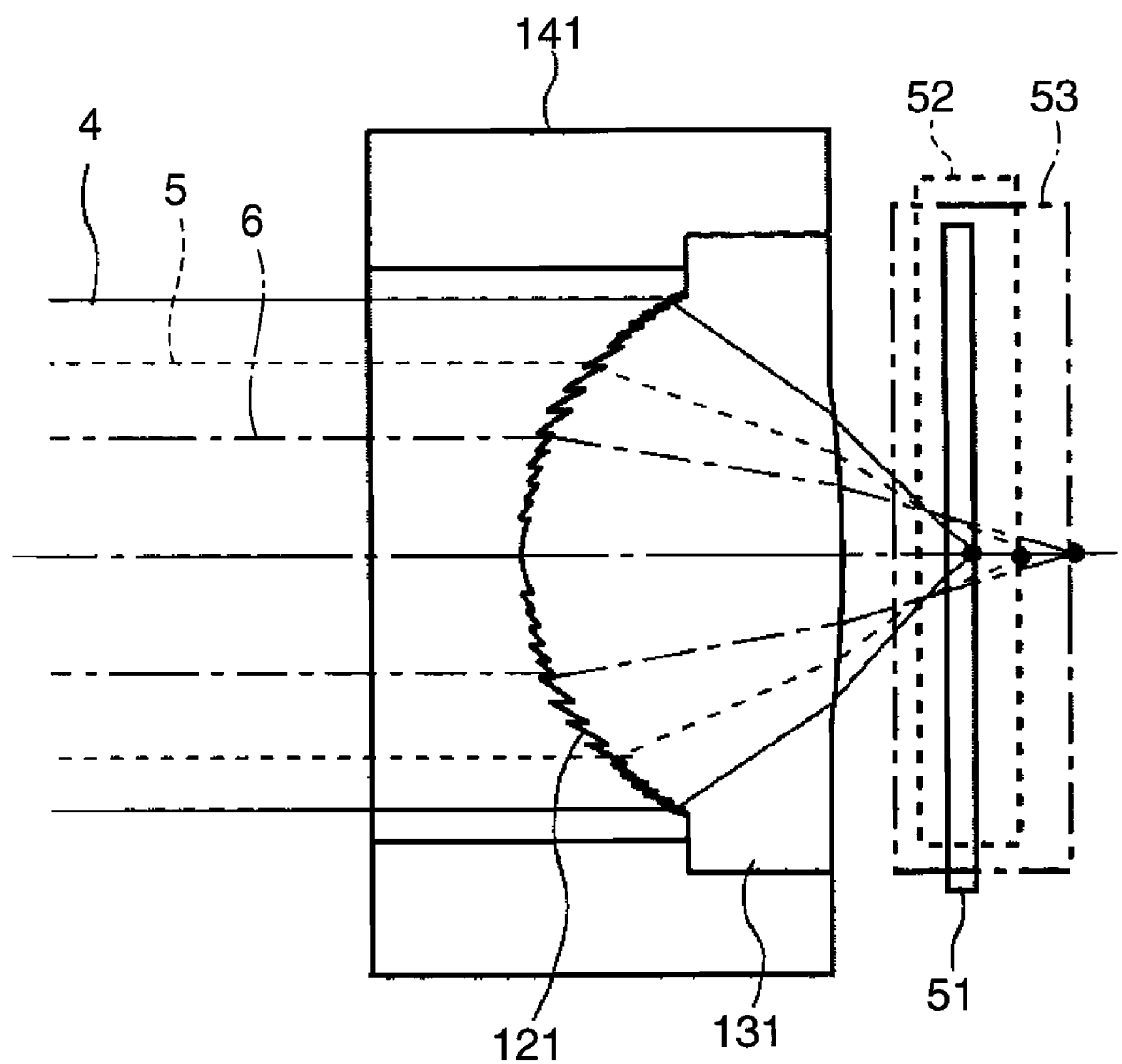
FIG. 6 is an enlarged cross section showing a modification of the objective lens according to the first embodiment of the invention.

FIG. 6 is an enlarged cross section showing a modification of the objective lens according to the first embodiment of the invention. Referring to FIG. 6, a diffraction element 121 is formed on the surface of a refracting lens 131 forming an objective lens 141. The diffraction element 121 operates in the same manner as the diffraction element 12 shown in FIG. 2. In other words, in the region of the inner peripheral portion corresponding to the numerical aperture NA3 of the diffraction element 121, the third-order diffracted light of the light beam 4 is converged onto the optical disc 51 having the protective layer thickness t1, the second-order diffracted light of the light beam 5 is converged onto the optical disc 52 having the protective layer thickness t2, and the second-order diffracted light of the light beam 6 is converged onto the optical disc 53 having the protective layer thickness t3.

In addition, in the region of the intermediate peripheral portion of the diffraction element 121 corresponding to the numerical apertures NA3 to NA2, the sixth-order diffracted light of the light beam 4 is converged onto the optical disc 51 having the protective layer thickness t1, the fourth-order diffracted light of the light beam 5 is converged onto the optical disc 52 having the protective layer thickness t2, and the fourth-order diffracted light of the light beam 6 is hardly generated, which can limit the aperture to the numerical aperture NA3.

Further, in the region of the outer peripheral portion of the diffraction element 121 corresponding to the numerical apertures NA2 to NA1, in a case where m is an integer other than multiples of 3, the opening element 121 and the refracting lens 131 are configured to allow the m-th order diffracted light of the light beam 4 to be converged onto the optical disc 51 having the protective layer thickness t1 and to inhibit diffracted light of the light beams 5 and 6 from being converged onto the optical discs 52 and 53, respectively.

In the configuration of the objective lens 14 shown in FIG. 2, the off-axis performance is deteriorated because the convex lens action is provided by forming the diffraction element 12 on the plane. The off-axis performance, however, can be made satisfactory by forming the diffraction element 121 on the surface of the refracting lens 131 as in the configuration of the objective lens 141 shown in FIG. 6. It is thus possible to obtain an objective lens having the satisfactory off-axis performance without causing displacement of the position between the diffraction element and the refracting lens.

Also, in the configuration of the objective lens shown in FIG. 2, the chromatic aberration of the refracting lens 13 and the chromatic aberration of the diffraction element 12 are cancelled each other out by providing the convex lens action to the diffraction element 12. This chromatic aberration is a change of the focal distance when the wavelength changes from the design wavelength. For example, when the wavelength $\lambda 1$ becomes longer by $\Delta\lambda 1$, the refraction factor of the refracting lens 13 is decreased by $\Delta n1$. This makes the convex lens action slightly smaller. However, because the diffraction angle increases by $\Delta\theta$ as the wavelength becomes longer by $\Delta\lambda 1$, which makes the convex lens action slightly larger. The diffraction element 12 having the convex lens action thus becomes able to suppress a change of the focal distance in response to a change of the wavelength.

Meanwhile, the objective lens 14 that converges a light beam onto the optical disc 51 has a large numerical aperture NA, and has a shorter operating distance than the objective lens that converges a light beam onto the optical disc 53 alone. Hence, providing the convex lens action to the diffraction element 12 makes it difficult to ensure the operating distance with respect to the optical disc 53 having a thick protective layer. In the configuration in FIG. 2, the operating distance of the objective lens 14 is extended by making the focal distance longer. However, the light beam diameter increases when the focal distance becomes longer, which is disadvantageous in making the optical head smaller in size. The configuration to address this inconvenience is shown in FIG. 7.

Figure 7:
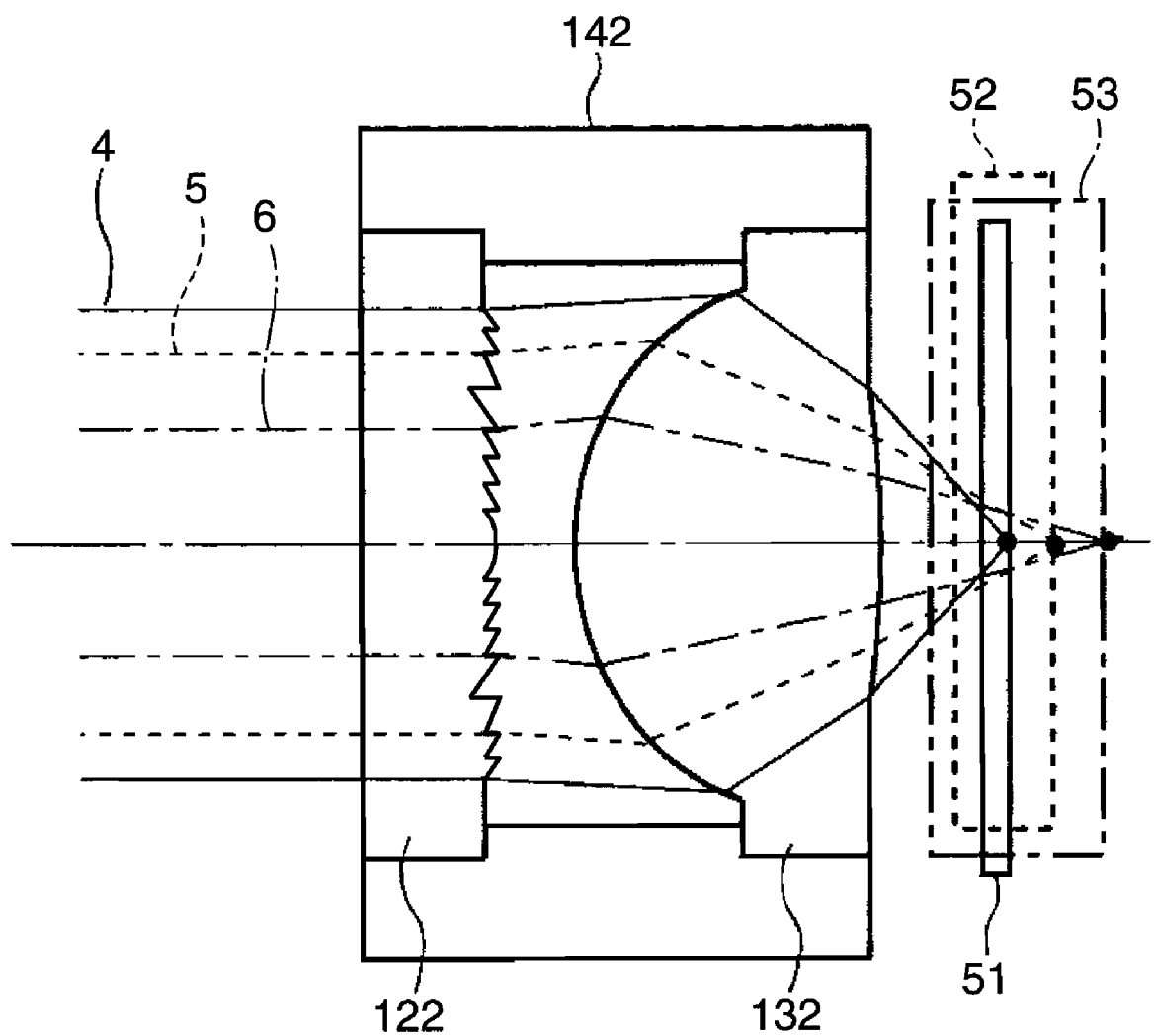
FIG. 7 is an enlarged cross section showing another modification of the objective lens according to the first embodiment of the invention.

FIG. 7 is an enlarged cross section showing another modification of the objective lens according to the first embodiment of the invention. Referring to FIG. 7, an objective lens 142 is formed of a diffraction element 122 and a refracting lens 132 and configured to provide the concave lens action to the diffraction element 122. When the concave lens action is provided to the diffraction element 122, the chromatic aberration is generated and the focal distance changes in response to a change of the wavelength. The chromatic aberration, however, can be corrected by another means. For example, by forming a diffraction element on the surface of the collimator lens (FIG. 1), it is possible to reduce the chromatic aberration.

Referring to FIG. 7, as with the diffraction element 12, in the diffraction element 122, the configurations of the diffraction grating are changed in the respective inner peripheral portion, intermediate peripheral portion, and the outer peripheral portion, so that the apertures for light respectively having the wavelengths $\lambda 3$ and $\lambda 2$ can be limited. By providing the concave lens action, the converging position of the light beam 6 when information is recorded in/played back from the optical disc 53 is located further away from the refracting lens 132, which makes it possible to extend the operating distance. Also, as with the configuration shown in FIG. 6, by forming the diffraction element 122 on the surface of the refracting lens 132, it is possible to obtain an objective lens having the satisfactory off-axis performance without causing displacement of the position between the diffraction element and the refracting lens.

In this embodiment, by disposing the diffraction grating for three beams between the light source and the beam splitter 9 in FIG. 1, it is possible to obtain the tracking error signals of the optical discs 51, 52, and 53 by the well known differential push-pull (DPP) method.

Also, by moving the collimator lens 10 in the optical axis direction (the right-left direction in FIG. 1), it is possible to change the degree of collimation of a light beam. With the optical disc 51, spherical aberration is generated more than a conventional optical disc because of a thickness error of the protective layer and an interlayer thickness of the dual-layer disc. However, it is possible to correct the spherical aberration by moving the collimator lens 10 in the optical axis direction. Regarding the correction of the spherical aberration by moving the collimator lens 10, it is possible to correct the protective layer thickness of the order of $\pm 30$ μm when the numerical aperture NA is 0.85. However, in a case where information is recorded in/played back from a DVD with the use of the objective lens 14 corresponding to the protective layer thickness of 0.1 mm, it is necessary to compensate for the protective layer difference by 0.5 mm or more. Hence, merely moving the collimator lens 10 is insufficient to achieve the correcting performance for the spherical aberration, and the wave front conversion as in this embodiment is necessary.

Further, in this embodiment, the compatibility among a BD, a DVD, and a CD has been illustrated and described by way of example. It should be appreciated, however, that the invention is not limited to this configuration, and the invention is also applicable to achieve the compatibility among an HD-DVD, a DVD, and a CD. In other words, a case where information is recorded/played back in/from an optical disc having the protective layer thickness t1 of about 0.1 mm at the numerical aperture of 0.85 has been described. However, the compatibility with an HD-DVD can be achieved by recording/playing back information in/from an optical disc having the protective layer thickness t1 of about 0.6 mm at the numerical aperture of 0.65.

As has been described, according to the first embodiment, it is possible to set numerical apertures corresponding to the respective optical discs by correcting spherical aberration resulting from a difference in thickness of the protective layers for optical discs of plural kinds. Also, because the objective lens can be formed of a single molded lens, it is possible to achieve a stable converging performance at low costs.

Second Embodiment

A second embodiment of the invention will now be described. In FIG. 2 used to describe the first embodiment above, the chromatic aberration, in particular, the wavelength dependence of the focal distance is cancelled out by providing the convex lens action to the diffraction element. However, because it is configured to correct the spherical aberration of optical discs each having a different protective layer by exploiting a difference of the wavelengths, the spherical aberration is generated when the wavelength varies from the design wavelength.

Figure 8:
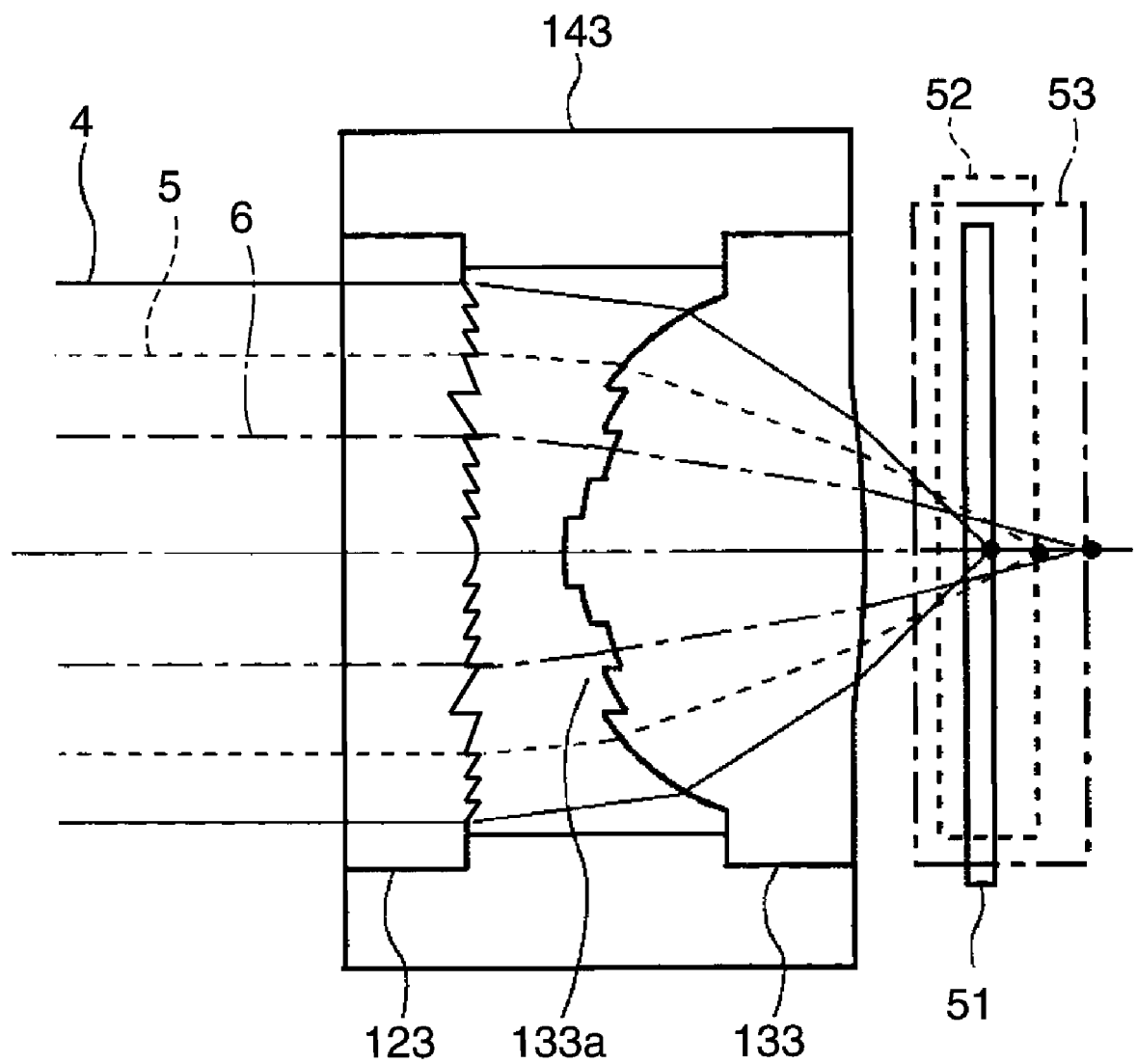
FIG. 8 is an enlarged cross section showing an example of an objective lens according to a second embodiment of the invention.

The configuration to correct this spherical aberration will be described using FIG. 8 and FIG. 9. FIG. 8 is an enlarged cross section showing an example of an objective lens according to the second embodiment of the invention. Referring to FIG. 8, an objective lens 143 of this embodiment is formed of a diffraction element 123 and a refracting lens 133, and has a configuration in which the refracting lens 13 of the first embodiment above is replaced with the refracting lens 133. The refracting lens 133 is provided with a phase shift pattern 133a having a step-profile that generates a phase difference in incident light. Referring to FIG. 8, the phase shift pattern 133a is formed on the surface of the refracting lens 133 that does not oppose an optical disc. By forming the phase shift pattern 133a and the refracting lens 133 integrally as a single piece, it is possible to eliminate an error of the relative position between the refracting lens 133 and the phase shift pattern 133a.

Figure 9:
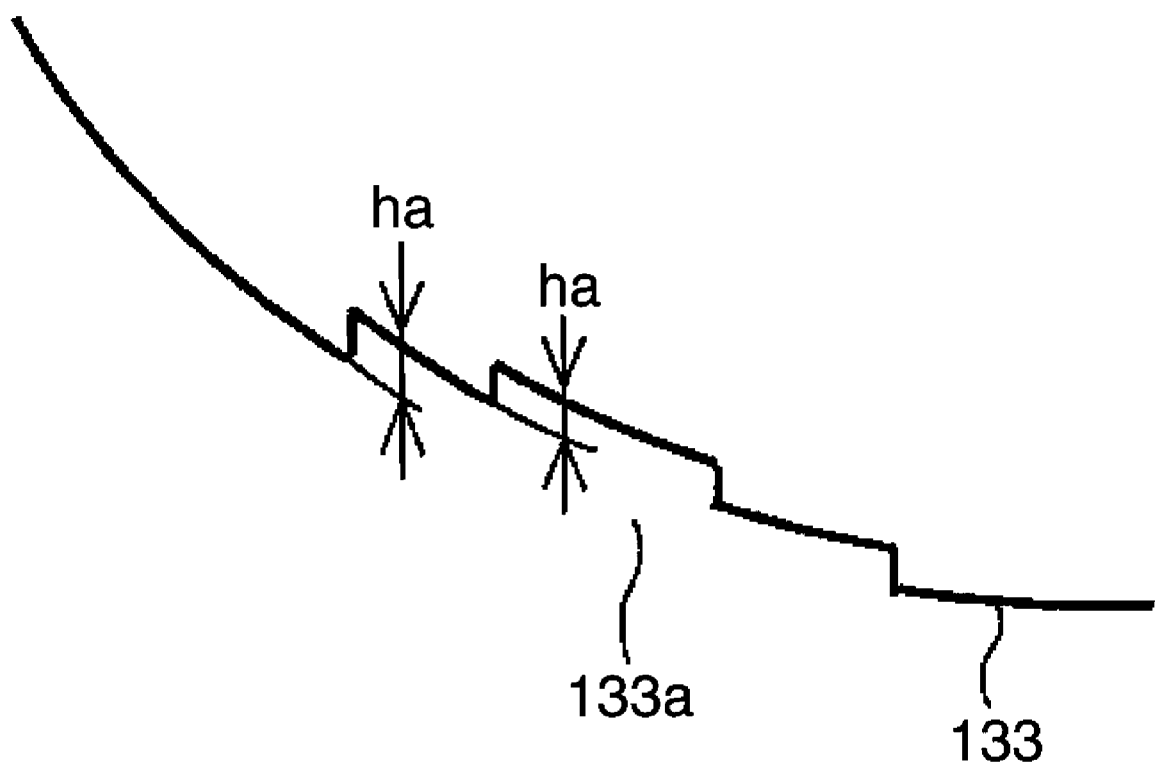
FIG. 9 is an enlarged cross section showing an example of a phase shift pattern according to the second embodiment of the invention.

FIG. 9 is a partial enlarged cross section of the phase shift pattern 133a shown in FIG. 8. Referring to FIG. 9, the phase shift pattern 133a has plural steps each having a height ha. The height ha of the step is set so as to generate a difference of the optical path lengths, which is ten times the wavelength λ1, in other words, to generate a phase difference of 20π radians. That is to say, let n1 be the refraction factor of a base material forming the phase shift pattern 133a with respect to the wavelength λ1, then the height ha of the step is determined so as to satisfy Equation (3) below:

$$ha = 10 \times \lambda1/(n1-1) \quad (3).$$

For example, given that the base material is BK7 and the wavelength λ1 is 405 nm, then the refraction factor n1 is 1.5302 and the height ha of the step is found to be 7.639 μm in accordance with Equation (3) above.

In a case where light having the wavelength λ goes incident on the step having the height ha, given that a difference of the optical path lengths with respect to the wavelength λ is k times the wavelength, the following is established:

$$10 \times \lambda1/(n1-1) = k \times \lambda/(n-1) \quad (4).$$

In a case where light having the wavelength λ2 of 655 nm goes incident on the step having the height ha, because the refraction factor n2 of BK7 with respect to light having the wavelength λ2 is 1.5144, by substituting λ2 and n2 for and n in Equation (4) above, k is found to be 6.0. A difference of the optical path lengths is therefore six times the wavelength. In other words, the step that generates a difference of the optical path lengths, which is ten times the wavelength, for light having the wavelength λ1 also generates a difference of the optical path lengths, which is six times the wavelength, for light having the wavelength λ2.

Also, in a case where light having the wavelength λ3 of 780 nm goes incident on the step having the height ha, because the refraction factor of BK7 with respect to light having the wavelength λ3 is 1.5112, by substituting λ3 and n3 for λ and n in Equation (4) above, k is found to be 5.0. A difference of the optical path lengths is therefore five times the wavelength. In other words, the step that generates a difference of the optical path lengths, which is ten times the wavelength, for light having the wavelength λ1 also generates a difference of the optical path lengths, which is five times the wavelength, for light having the wavelength λ3.

The phase change generating a difference of the optical path lengths, which is an integral multiple of the wavelength, is an integral multiple of 2π radians, and does not generate a phase difference in practice. Hence, the wave front will not change for the design wavelengths of the wavelengths λ1, λ2, and λ3. When a change of the wavelength of the order of several nm from the design wavelength occurs due to a variation of the wavelength of the laser light source or the like, a difference of the optical path lengths varies from an integral multiple of the wavelength, which gives rise to a phase change. The phase shift pattern can be formed by excavating the base material inward as is shown in FIG. 8, or conversely, by piling up steps on the base material outward. Hence, a direction of the phase change in response to a variance of the wavelength can be set freely. For example, for light having the wavelength λ1, a phase change Δϕ1 in response to a change of the wavelength of 1 nm is found as follows:

$$\Delta\phi1 = 20\pi/405 = 0.049\pi \text{(radian)}.$$

By forming the phase shift pattern by piling up steps having the height ha at every position at which a phase change per wavelength of 1 nm caused by the lens or the diffraction element becomes 0.049π radian, it is possible to correct aberration resulting from a change of the wavelength. For light having the wavelength λ2, a phase change Δϕ2 in response to a change of the wavelength of 1 nm is found as follows:

$$\Delta\phi2 = 12\pi/655 = 0.018\pi \text{(radian)}.$$

Further, for light having the wavelength λ3, a phase change Δϕ3 in response to a change of the wavelength of 1 nm is found as follows:

$$\Delta\phi3 = 10\pi/780 = 0.013\pi \text{(radian)}.$$

In comparison with light having the wavelength λ1, the phase change is small for light respectively having the wavelengths λ2 and λ3, which, however, does not cause any problem because aberration per change of the wavelength of 1 nm caused by the lens or the diffraction element is small, too.

The phase shift pattern 133a uses the height ha as one unit. However, using an integral multiple thereof (twofold, threefold, and so forth) as one unit does not cause a change of the wave front to the design wavelength. It is therefore possible to change the wave front in response to a change of the respective wavelengths alone.

As with the first embodiment above, a correction of the protective layer thickness is made in such a manner that, in the inner peripheral portion of the diffraction element 123 corresponding to the numerical aperture NA3, the third-order diffracted light of the light beam 4 is converged onto the optical disc 51 having the protective layer thickness t1, the second-order diffracted light of the light beam 5 is converged onto the optical disc 52 having the protective layer thickness t2, and the second-order diffracted light of the light beam 6 is converged onto the optical disc 53 having the protective layer thickness t3. Also, in the intermediate peripheral portion corresponding to the numerical apertures NA3 to NA2, the sixth-order diffracted light of the light beam 4 is converged onto the optical disc 51 having the protective layer thickness t1, the fourth-order diffracted light of the light beam 5 is converged onto the optical disc 52 having the protective layer thickness t2 and the fourth-diffracted light of the light beam 6 is hardly generated, which makes it possible to limit the aperture to the numerical aperture NA3. Further, in the outer peripheral portion corresponding to the numerical apertures NA2 to NA1, the diffraction element 123 and the refracting lens 133 are configured in such a manner that, given that m is an integer other than multiples of 3, then, the m-th order diffracted light of the light beam 4 is converged onto the optical disc 51 having the protective layer thickness t1 while diffracted light of the light beam 5 and the light beam 6 is inhibited from being converged onto the optical disc 52 and the optical disc 53, respectively.

Figure 10:
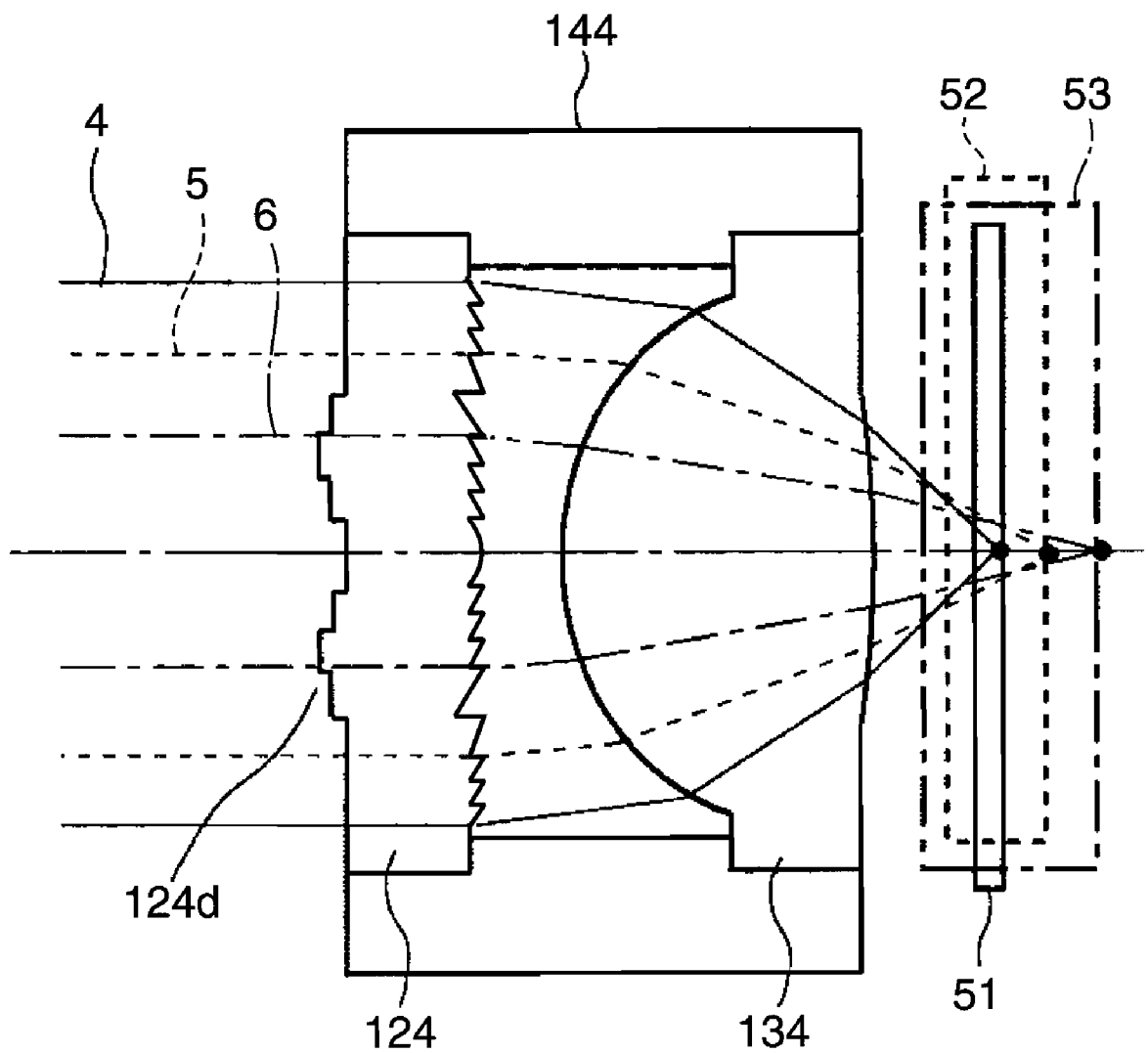
FIG. 10 is an enlarged cross section showing a modification of the objective lens according to the second embodiment of the invention.
Figure 11:
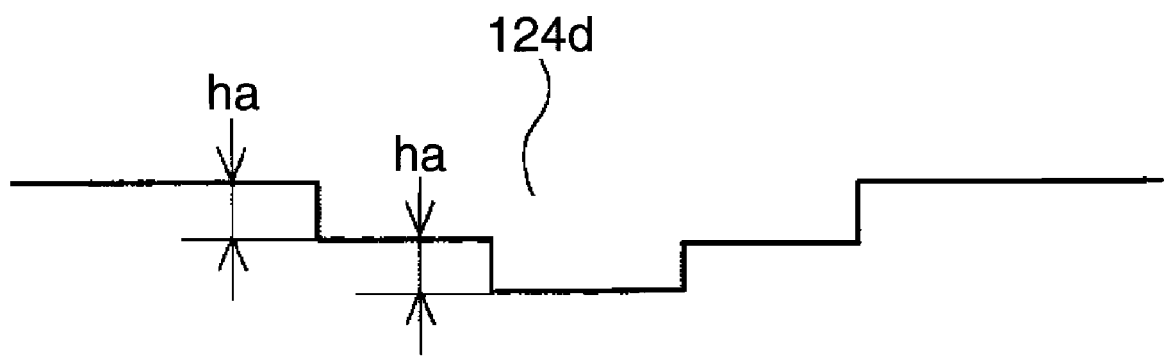
FIG. 11 is an enlarged cross section showing a modification of the phase shift pattern according to the second embodiment of the invention.

FIG. 10 is an enlarged cross section showing a modification of the objective lens according to the second embodiment of the invention. Referring to FIG. 10, an objective lens 144 of this embodiment is formed of a diffraction element 124 provided with a phase shift pattern 124*d* formed on the substrate surface and a refracting lens 134. FIG. 11 is a partial enlarged cross section of the phase shift pattern 124*d* shown in FIG. 10.

The phase shift pattern 124*d* is of the same configuration as the phase shift pattern 133*a* shown in FIG. 8 and operates in the same manner. More specifically, the phase shift pattern 124*d* is formed by piling up steps each having the height ha and providing a difference of the optical path lengths, which is ten times the wavelength for light having the wavelength $\lambda 1$, and it generates a difference of the optical path lengths, which is six times the wavelength, for light having the wavelength $\lambda 2$, and generates a difference of the optical path lengths, which is five times the wavelength, for light having the wavelength $\lambda 3$. A phase difference is not generated in practice even in the presence of a difference of the optical path lengths, which is an integral multiple of the wavelength. However, when the wavelength changes from the design wavelength, a difference of the optical path lengths varies from an integral multiple of the wavelength, which gives rise to a phase change. It is possible to correct aberration resulting from a change of the wavelength by using this phase change.

Figure 12:
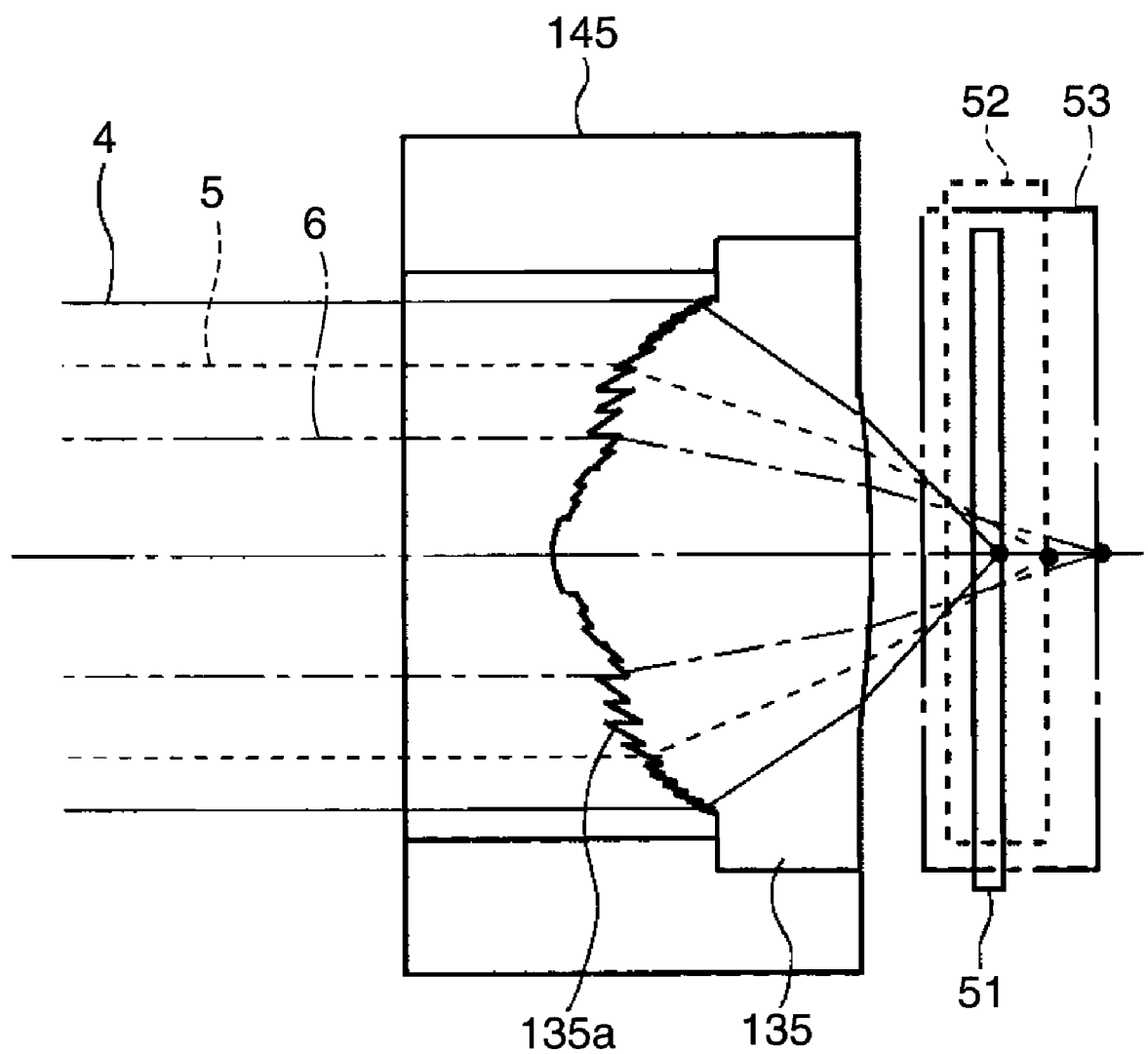
FIG. 12 is an enlarged cross section showing another modification of the objective lens according to the second embodiment of the invention.
Figure 13:
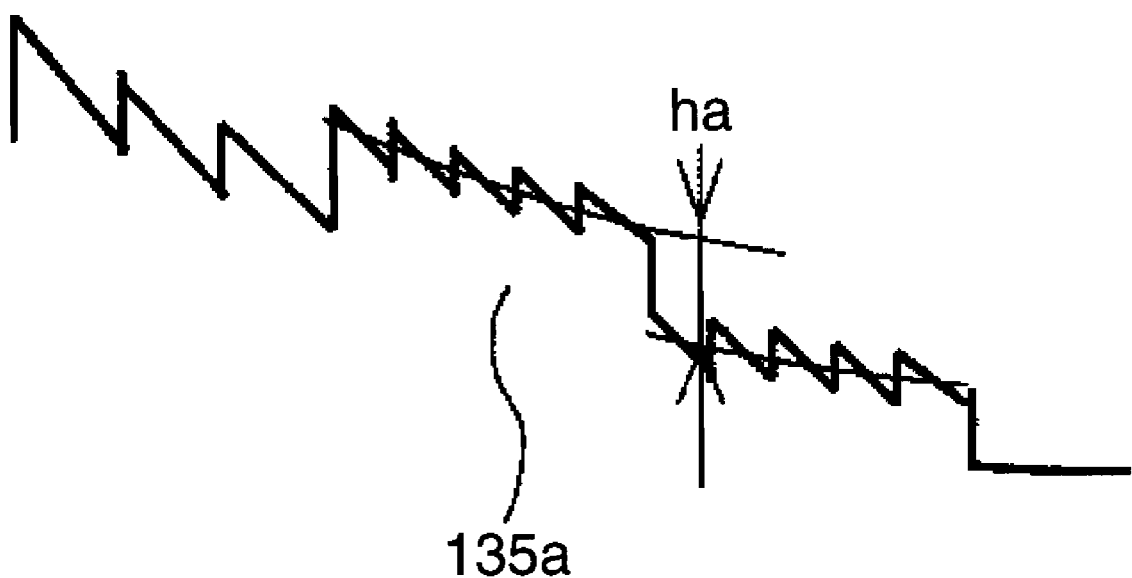
FIG. 13 is an enlarged cross section showing another modification of the phase shift pattern according to the second embodiment of the invention.

FIG. 12 is an enlarged cross section showing another modification of the objective lens according to the second embodiment of the invention. Referring to FIG. 12, an objective lens 145 of this embodiment is formed of a refracting lens 135 with which a diffraction element and a phase shift pattern 135*a* are formed integrally on the substrate surface. FIG. 13 is a partial enlarged cross section of the diffraction element and the phase shift pattern 135*a* shown in FIG. 12.

The diffraction element and the phase shift pattern 135*a* operate in the same manner, respectively, as the diffraction element 123 and the phase shift pattern 133*a* shown in FIG. 8. More specifically, it is configured in such a manner that the diffraction element corrects spherical aberration resulting from a difference in thickness of the protective layers, and the phase shift pattern corrects aberration resulting from a change of the wavelength by piling up steps each having the height ha and generating a difference of the optical path lengths, which is ten times the wavelength, for light having the wavelength $\lambda 1$, generating a difference of the optical path lengths, which is six times the wavelength, for light having the wavelength $\lambda 2$, and generating a difference of the optical path lengths, which is five times the wavelength, for light having the wavelength $\lambda 3$.

In the descriptions above, the convex lens action is provided to the diffraction element. As has been described using FIG. 2, the purpose of this configuration is to correct a change of the focal distance resulting from chromatic aberration by the convex lens action exerted by the diffraction element. It is thus possible to obtain the performance as designed by correcting a change of the focal distance resulting from chromatic aberration by the diffraction element and by correcting spherical aberration resulting from chromatic aberration by the phase shift pattern. As with the first embodiment above, by providing the concave lens action to the diffraction element, it is possible to ensure an operating distance when information is recorded in/played back from the optical disc 53 having a thick protective layer, and it is also possible to reduce a focal distance change in response to a change of the wavelength by the collimator lens or the like provided to the diffraction element.

In this embodiment, the compatibility among a BD, a DVD, and a CD has been illustrated and described by way of example. It should be appreciated, however, that the invention is not limited to this configuration, and the invention is also applicable to achieve the compatibility among an HD-DVD, a DVD, and a CD. In other words, a case where information is recorded/played back in/from an optical disc having the protective layer thickness t1 of about 0.1 mm at the numerical aperture of 0.85 has been described. However, the compatibility with an HD-DVD can be achieved by recording/playing back information in/from an optical disc having the protective layer thickness t1 of about 0.6 mm at the numerical aperture of 0.65.

As has been described, in this embodiment, not only is it possible to achieve the compatibility among discs of different kinds, but it is also possible to correct spherical aberration resulting from chromatic aberration, which enables stable information playback and recording even when the wavelength changes. Problems of the compatibility among discs of different kinds and corrections of chromatic aberration can be solved by the diffraction element and the phase shift pattern alone.

Third Embodiment

Figure 14:
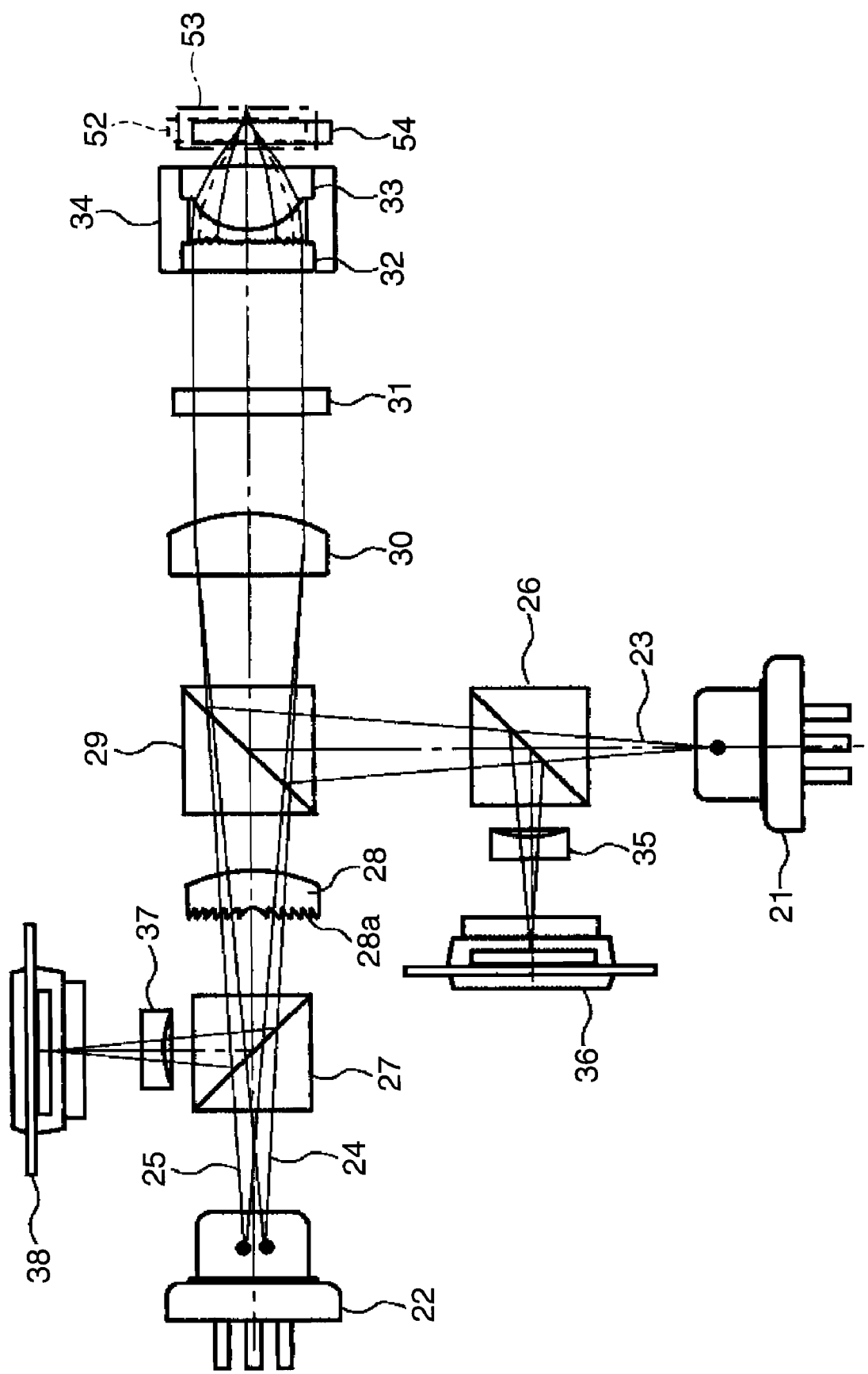
FIG. 14 is a cross section showing the overall configuration of an optical head according to a third embodiment of the invention.

A third embodiment of the invention will now be described. FIG. 14 is a cross section showing the overall configuration of an optical head according to a third embodiment of the invention. Referring to FIG. 14, numeral 21 denotes a blue laser light source that emits light having a wavelength $\lambda 1$ (almost 405 nm) and numeral 22 denotes a double-wavelength laser light source that emits light having a wavelength $\lambda 2$ (almost 655 nm) and light having a wavelength $\lambda 3$ (almost 780 nm). Numeral 28 denotes a diffraction lens that has both the diffracting action and the refracting action and acts as a convex lens. Numeral 30 denotes a collimator lens and numeral 34 denotes an objective lens. The objective lens 34 is formed of a diffraction element 32 and a refracting lens 33.

Numeral 54 denotes an optical disc having a protective layer thickness t1 of about 0.6 mm and it is an optical information medium in/from which information is recorded/played back with a light beam having the wavelength $\lambda 1$ at the numerical aperture NA1, for example, an optical disc used as an HD-DVD. Numeral 52 denotes an optical disc having a protective layer thickness t2 of about 0.6 mm and it is an optical information medium in/from which information is recorded/played back with a light beam having the wavelength $\lambda 2$ at the numerical aperture NA2, for example, an optical disc used as a DVD. Numeral 53 denotes an optical disc having a protective layer thickness t3 of about 1.2 mm and it is an optical information medium in/from which information is recorded/played back with a light beam having the wavelength $\lambda 3$ at the numerical aperture NA3, for example, an optical disc used as a CD. For these optical discs, the numerical apertures NA1 is 0.65, NA2 is 0.6, and NA3 is 0.45 to 0.5. In FIG. 14, for ease of illustration, the protective layers alone from the surface on which a light beam comes incident to the information recording surface are shown as the optical discs 54 (solid line), 52 (broken line), and 53 (alternate long and short dashed line).

When information is recorded in/played back from the optical disc 54 having a high recording density, a light beam 23 having the wavelength $\lambda 1$ and emitted from the blue laser light source 21 passes through a prism 26 and goes incident on a prism 29. The prism 26 is an optical path branching element having a polarization split characteristic to reflect linear polarized light in one direction and to transmit linear polarized light in a direction at right angles with the firstly mentioned direction for light having the wavelength λ1. The polarization direction of the light beam 23 emitted from the blue laser light source 21 is set so as to pass through the prism 26. The prism 29 is an optical path branching element that reflects light having the wavelength λ1 and transmits light respectively having the wavelengths λ2 and λ3. The light beam 23 coming incident on the prism 29 is reflected on the prism 29 and collected by a collimator lens 30 to become almost parallel light, which is converted to circular polarized light from linear polarized light by a wavelength plate 31. The wavelength plate 31 is configured to act as a ¼ wavelength plate for light respectively having the wavelengths λ1 and λ2 and not to act as a wavelength plate for light having the wavelength λ3. Further, the light beam 23 is focused by the objective lens 34 formed of the diffraction element 32 and the refracting lens 33 so as to be converged onto the information recording surface of the optical disc 54 via the protective layer having thickness t1.

The light beam 23 reflected on the information recording surface of the optical disc 54 travels inversely in the optical path it has traveled to be converted to linear polarized light in a direction at right angles with the outward path by the wavelength plate 31 and is reflected on the prism 29 and the prism 26. The light beam 23 is then provided with astigmatism by a detection lens 35 so as to convert the optical magnification thereof and then goes incident on a light detector 36. By applying computation to an output signal from the light detector 36, a servo signal including a focus error signal used for the focus control and a tracking error signal used for the tracking control as well as an information signal of image and sound information are obtained. The focus error signal is obtained, for example, by the astigmatic method and the tracking error signal is obtained, for example, by the push-pull method.

When information is recorded in/played back from the optical disc 52, a light beam 24 having the wavelength λ2 and emitted from the double-wavelength laser light source 22 passes through a prism 27, undergoes the convex lens action exerted by the diffraction lens 28, and passes through the prism 29. The prism 27 is an optical path branching element having a polarization split characteristic to reflect linear polarized light in one direction and to transmit linear polarized light in a direction at right angles with the firstly mentioned direction for light having the wavelength λ2, and having a half mirror characteristic to transmit a part of light having the wavelength λ3 while reflecting another part of the light. The polarization direction of the light beam 24 emitted from the double-wavelength laser light source 22 is set so as to pass through the prism 27. A diffraction element 28a is formed on the surface of the diffraction lens 28, and light having the wavelength λ2 undergoes the convex lens action more significantly than light having the wavelength λ3. The light beam 24 having passed through the prism 29 is collected by the collimator lens 30 and becomes almost parallel light, which is then converted to circular polarized light from linear polarized light by the wavelength plate 31. Further, the light beam 24 is focused by the objective lens 34 formed of the diffraction element 32 and the refracting lens 33 so as to be converged onto the information recording surface of the optical disc 52 via the protective layer having thickness t2.

The light beam 24 reflected on the information recording surface of the optical disc 52 travels inversely in the optical path it has traveled to be converted to linear polarized light in a direction at right angles with the outward path by the wavelength plate 31. It then passes through the prism 29 and is reflected on the prism 27. It is then provided with astigmatism by the detection lens 37 so as to convert the optical magnification thereof, and then goes incident on the light detector 38. By applying computation to an output signal from the light detector 38, a servo signal including a focus error signal used for the focus control and a tracking error signal used for the tracking control as well as an information signal of image and sound information are obtained.

When information is recorded in/played back from the optical disc 53, a part of a light beam 25 having the wavelength λ3 and emitted from the double-wavelength laser light source 22 passes through the prism 27, undergoes the convex lens action exerted by the diffraction lens 28, and passes through the prism 29.

Light having the wavelength λ3 undergoes the convex lens action less than the light having the wavelength λ2, and the light beam 25 refracted by the collimator lens 30 becomes divergent light. Further, the light beam 25 passes through the wavelength plate 31 and is focused by the objective lens 34 formed of the diffraction element 32 and the refracting lens 33, after which it is converged onto the information recording surface of the optical disc 53 via the protective layer having thickness t3.

The light beam 25 reflected on the information recording surface of the optical disc 53 travels inversely in the optical path it has traveled. A part of the light is reflected on the prism 27 and astigmatism is provided by the detection lens 37 so as to convert the optical magnification thereof, and then goes incident on the light detector 38. By applying computation to an output signal from the light detector 38, a servo signal including a focus error signal used for the focus control and a tracking error signal used for the tracking control as well as an information signal of image and sound information are obtained.

Figure 15:
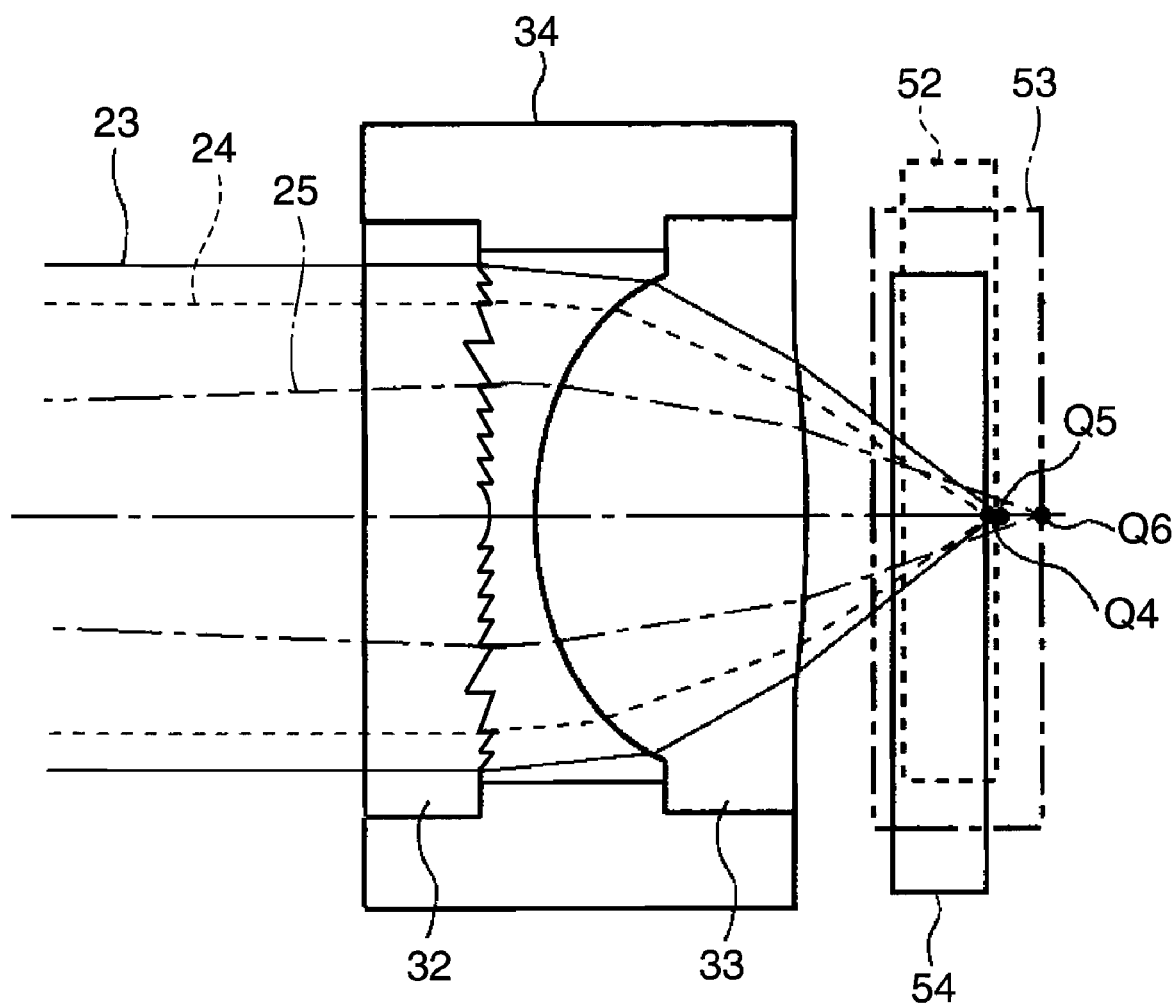
FIG. 15 is an enlarged cross section showing an example of an objective lens according to the third embodiment of the invention.

The operations and the configurations of the diffraction element 32 and the refracting lens 33 will now be described using FIG. 15 and FIG. 16. FIG. 15 is an enlarged cross section showing an example of the objective lens 34 according to the third embodiment of the invention to show propagation of light converged by the diffraction element 32 and the refracting lens 33 that together form the objective lens 34. Referring to FIG. 15, the numerical aperture NA1 of the objective lens 34 is set to 0.65 and the diffraction order of the diffraction element 32 is the same as the diffraction element 12 of the first embodiment. The refracting lens 33 is configured to converge the light beam 23 having undergone the diffracting action exerted by the diffraction element 32 onto the recording surface of the optical disc 54 via the protection layer having thickness t1, and by exploiting a difference of the diffracting actions resulting from a difference of the wavelengths, to converge the light beam 24 having the wavelength λ2 onto the recording surface of the optical disc 52 via the protective layer having thickness t2 and to converge the light beam 25 having the wavelength λ3 onto the recording surface of the optical disc 53 via the protective layer having thickness t3.

The light beam 23 propagates through an optical path indicated by a solid line so as to be converged to a point Q4. The light beam 24 propagates through an optical path indicated by a broken line so as to be converged to a point Q5. The light beam 25 propagates through an optical path indicated by an alternate long and short dash line so as to be converged to a point Q6. Because information is recorded in/played back from the optical discs 54 and 52 having the same protective layer thickness at different wavelengths, the diffraction element 32 has to correct aberration generated due to a difference of the wavelengths at the refracting lens 33. Hence, spherical aberration generated in the protective layer of the optical disc 53 cannot be corrected sufficiently by the diffraction exerted by the diffraction element 32 alone, and a correction is made by changing the light beam 25 to divergent light. In the first and second embodiments above, too, the light beam 6 may be changed to divergent light in order to correct spherical aberration generated in the protective layer of the optical disc 53. When configured in this manner, it is effective in extending the operating distance.

Figure 16:
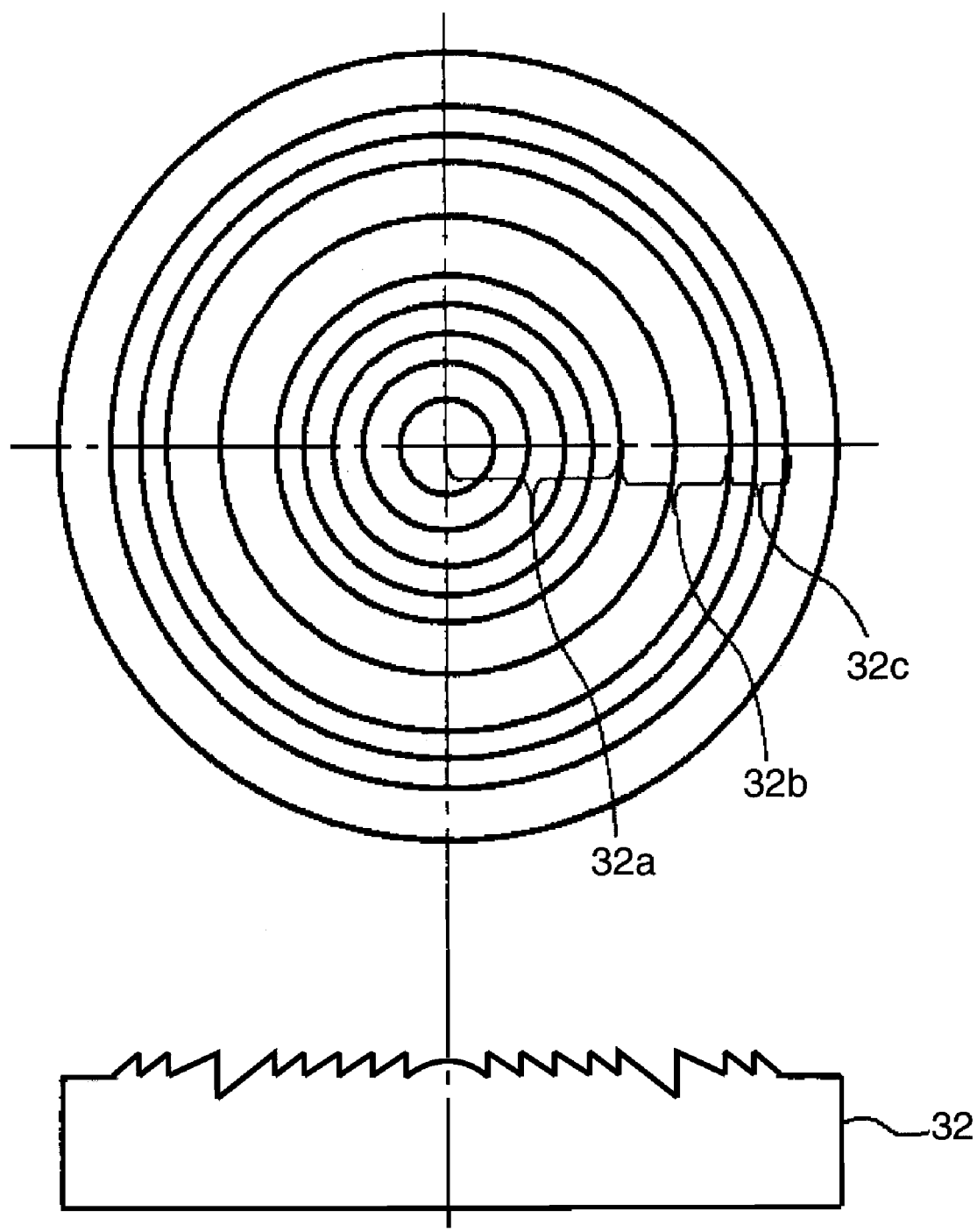
FIG. 16 is a view showing a plane (the upper side) and a cross section (the lower side) of a diffraction element according to the third embodiment of the invention.

FIG. 16 is a view showing the plane (the upper side on the sheet surface) and the cross section (the lower side on the sheet surface) of the diffraction element 32 shown in FIG. 15. As is shown in FIG. 16, the diffraction grating of the diffraction element 32 forms a concentric shape and has different configurations in an inner peripheral portion 32a, an intermediate peripheral portion 32b, and an outer peripheral portion 32c. The inner peripheral portion 32a of the diffraction element 32 is a portion corresponding to the numerical aperture NA3 and has a grating shape that generates the third-order diffracted light most strongly for the light beam 23 having the wavelength λ1, generates the second-order diffracted light most strongly for the light beam 24 having the wavelength λ2, and generates the second-order diffracted light most strongly for the light beam 25 having the wavelength of λ3.

The third-order diffracted light of the light beam 23 is converged onto the optical disc 54 via the refracting lens 33. The second-order diffracted light of the light beam 24 is converged onto the optical disc 52 via the refracting lens 33. The second-order diffracted light of the light beam 25 is converged onto the optical disc 53 via the refracting lens 33. By setting the depth h1 of the diffraction grating to 2.38 μm, which is the same depth in the first embodiment above, it is possible to obtain the same intensity at the same diffraction order. It should be noted that the light beam 25 goes incident on the diffraction element 32 in the form of divergent light; however, because the angle of incidence is so small that the diffraction order and the intensity are almost the same as those in the first embodiment.

The intermediate peripheral portion 32b of the diffraction element 32 is a portion corresponding to the numerical apertures NA3 to NA2 and has a grating shape that generates sixth-order diffracted light most strongly for the light beam 23 having the wavelength λ1, generates the fourth-order diffracted light most strongly for the light beam 24 having the wavelength λ2, and generates the third-order diffracted light most strongly while hardly generating the fourth-order diffracted light for the light beam 25 having the wavelength λ3.

The sixth-order diffracted light of the light beam 23 is converged onto the optical disc 54 via the refracting lens 33. The fourth-order diffracted light of the light beam 24 is converged onto the optical disc 52 via the refracting lens 33. As in the first embodiment above, by setting the depth h2 of the diffraction grating in the intermediate peripheral portion 32b to 4.76 μm, which is twice the depth h1 of the diffraction grating in the inner peripheral portion 32a, it is possible to obtain the same intensity at the same diffraction order. Accordingly, when the wavelength λ3 is 780 nm, the third-order diffracted light becomes the strongest and the fourth-order diffracted light is hardly generated.

The outer peripheral portion 32c of the diffraction element 32 is a portion corresponding to the numerical apertures NA2 to NA1 and has a grating shape that generates m-th order (m is an integer other than multiples of 3, for example, 2) most strongly for the light beam 23 having the wavelength λ1. This second-order diffracted light of the light beam 23 is converged onto the optical disc 54 via the refracting lens 33. By setting the depth h3 of the diffraction grating in the outer peripheral portion 32c to 1.59 μm, which is the same depth in the first embodiment above, the second-order diffracted light of the light having the wavelength λ1 achieves the highest intensity. In a case where the depth h3 of the diffraction grating in the outer peripheral portion 32c is set to m/3 times the depth h1 of the diffraction grating in the inner peripheral portion 32a, for example, to ⅔ times the depth h1, for the light beams 24 and 25, because the order corresponding to the ⅔ of the second-order diffraction is absent, diffracted light converged onto the optical discs 52 and 53 is no longer present, which makes it possible to limit the aperture.

The diffraction order changes in the inner peripheral portion 32a, the intermediate peripheral portion 32b, and the outer peripheral portion 32c of the diffraction element 32. However, by setting the pitch P of the diffraction grating in the same manner as in the first embodiment above, it is possible to make a change of the diffraction angle in response to a change of the wavelength constant. Accordingly, even when the wavelength changes, the position on the optical disc at which light is converged will not be displaced. It is thus possible to correct aberration resulting from a difference in thickness of the protective layers. It is thus possible to converge the light beams 23, 24, and 25, respectively, onto the optical discs 54, 52, and 53 via the diffraction element 32 and the refracting lens 33 at the respective suitable numerical apertures.

Herein, the second-order diffracted light of the light beam 23 is used in the outer peripheral portion 32c of the diffraction element 32. However, diffracted light at the other diffraction orders can be used as well. Let m be the diffraction order of the light beam 23 in this region, then both the light beam 24 and the light beam 25 are converged at positions different from those of the diffracted light in the inner peripheral portion 32a and the intermediate peripheral portion 32b unless m/3, which is a ratio with respect to the diffraction order in the inner peripheral portion 32a, becomes an integer. In other words, by setting the diffraction order m to an integer other than multiples of 3, the light beam 24 has no diffracted light to be converged onto the optical disc 52 and the light beam 25 has no diffracted light to be converged onto the optical disc 53, which makes it possible to limit the apertures.

Figure 17:
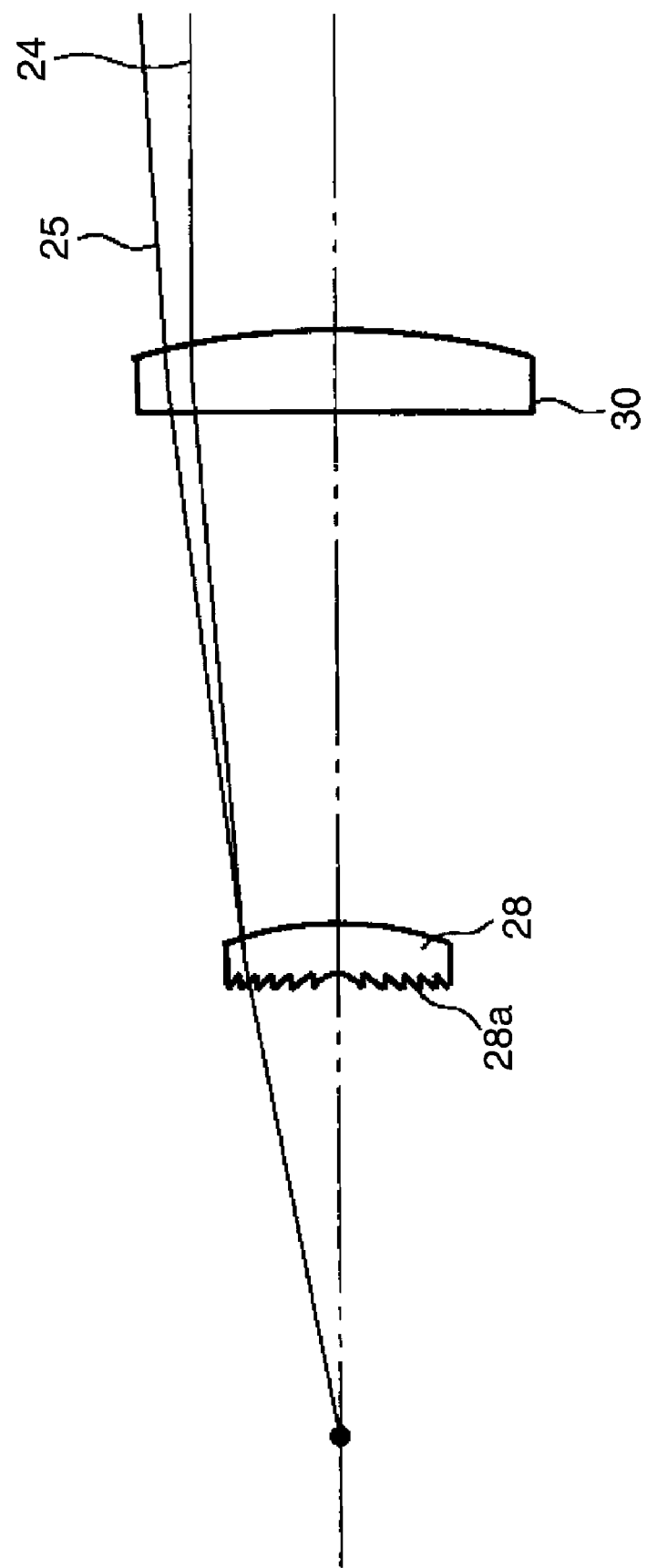
FIG. 17 is a view showing a manner in which light beams propagate through a diffraction lens and a collimator lens according to the third embodiment of the invention.

The operation of the diffraction lens 28 shown in FIG. 14 will now be described using FIG. 17. FIG. 17 is a view showing a manner in which the light beams 24 and propagate through the diffraction lens 28 and the collimator lens 30. Referring to FIG. 17, the diffraction element 28a has the concave lens action and the diffraction lens 28 also exerts the convex lens action as the concave lens action of the diffraction element 28a and the lens action by refraction are combined. Because the light having the wavelength λ3 is longer than the light having the wavelength λ2, the diffraction effect by the diffraction element 28a is larger and so is the concave lens action. Hence, the convex lens action the light having the wavelength λ3 undergoes in the diffraction lens 28 becomes smaller than the convex lens action the light having the wavelength λ2 undergoes.

Meanwhile, the diffraction lens 28 and the collimator lens 30 are configured to collect the light beam 24 having the wavelength λ2 to be changed to almost parallel light. Hence, the light beam 25 having the wavelength λ3, for which the convex lens action it undergoes in the diffraction lens 28 is small, is not changed to parallel light even when it is collected by the collimator lens 30, and it instead becomes divergent light. Hence, the light beam 24 and the light beam 25 go incident on the objective lens 34, respectively, in the form of almost parallel light and divergent light, and operate as described above.

In the configuration described above, in the presence of an error in the relative positions of the diffraction element 32 and the refracting lens 33, the wave front does not go incident on the refracting lens 33 as designed, which gives rise to aberration to the wave front of light respectively going incident on the optical discs 54, 52, and 53. The converging performance is thus deteriorated. It is therefore preferable to form the diffraction element 32 and the refracting lens 33 integrally as a single piece.

Figure 18:
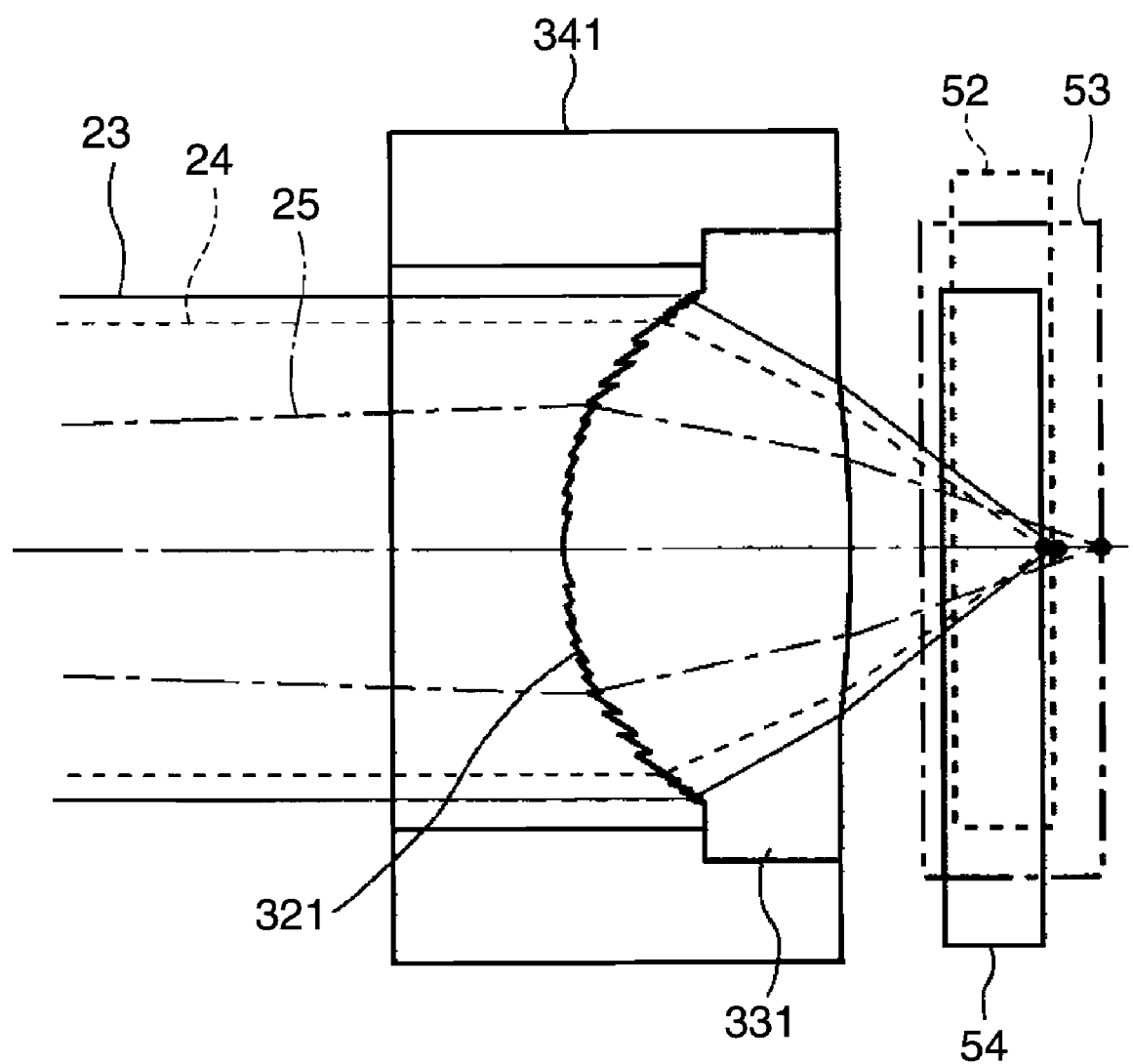
FIG. 18 is an enlarged cross section showing a modification of the objective lens according to the third embodiment of the invention.

FIG. 18 is an enlarged cross section showing a modification of the objective lens according to the third embodiment of the invention, and a diffraction element 321 is formed on the surface of a refracting lens 331 forming an objective lens 341. In FIG. 18, the diffraction element 321 operates in the same manner as the diffraction element 32 shown in FIG. 15.

In other words, in the region of the inner peripheral portion of the diffraction element 321 corresponding to the numerical aperture NA3, the third-order diffracted light of the light beam 23 is converged onto the optical disc 54 having the protective layer thickness t1, the second-order diffracted light of the light beam 24 is converged onto the optical disc 52 having the protective layer thickness t2, and the second-order diffracted light of the light beam 25 is converged onto the optical disc 53 having the protective layer thickness t3.

In addition, in the region of the intermediate peripheral portion of the diffraction element 321 corresponding to the numerical apertures NA3 to NA2, the sixth-order diffracted light of the light beam 23 is converged onto the optical disc 54 having the protective layer thickness t1, the fourth-order diffracted light of the light beam 24 is converged onto the optical disc 52 having the protective layer thickness t2, and the fourth-order diffracted light of the light beam 25 is hardly generated, which makes it possible to limit the aperture to the numerical aperture NA3.

Further, in the region of the outer peripheral portion of the diffraction element 321 corresponding to the numerical apertures NA2 to NA1, in a case where the diffraction order m is set to an integer other than multiples of 3, the diffraction element 321 and the refracting lens 331 are configured to allow the m-th order diffracted light of the light beam 23 to be converged onto the optical disc 54 having the protective layer thickness t1 and to inhibit diffracted light of the light beams 24 and 25 from being converged onto the optical discs 52 and 53, respectively.

In the configuration of the objective lens 34 shown in FIG. 15, because the convex lens action is provided by forming the diffraction element 32 on the plane, the converging performance is deteriorated when light coming incident on the diffraction element 32 inclines, that is, the off-axis performance is poor. In the configuration of the objective lens 341 shown in FIG. 18, however, the off-axis performance can be made satisfactory because the diffraction element is formed on the lens surface. When configured in this manner, it is possible to obtain an objective lens having the satisfactory off-axis performance without causing displacement of the position between the diffraction element and the refracting lens.

In this embodiment, the compatibility among an HD-DVD, a DVD, and a CD has been illustrated and described by way of example. It should be appreciated, however, that the invention is not limited to this configuration, and the invention is also applicable to achieve the compatibility among a BD, a DVD, and a CD. In other words, a case where information is recorded/played back in/from an optical disc having the protective layer thickness t1 of about 0.6 mm at the numerical aperture of 0.65 has been described. However, the compatibility with a BD can be achieved by recording/playing back information in/from an optical disc having the protective layer thickness t1 of about 0.1 mm at the numerical aperture of 0.85.

Figure 19:
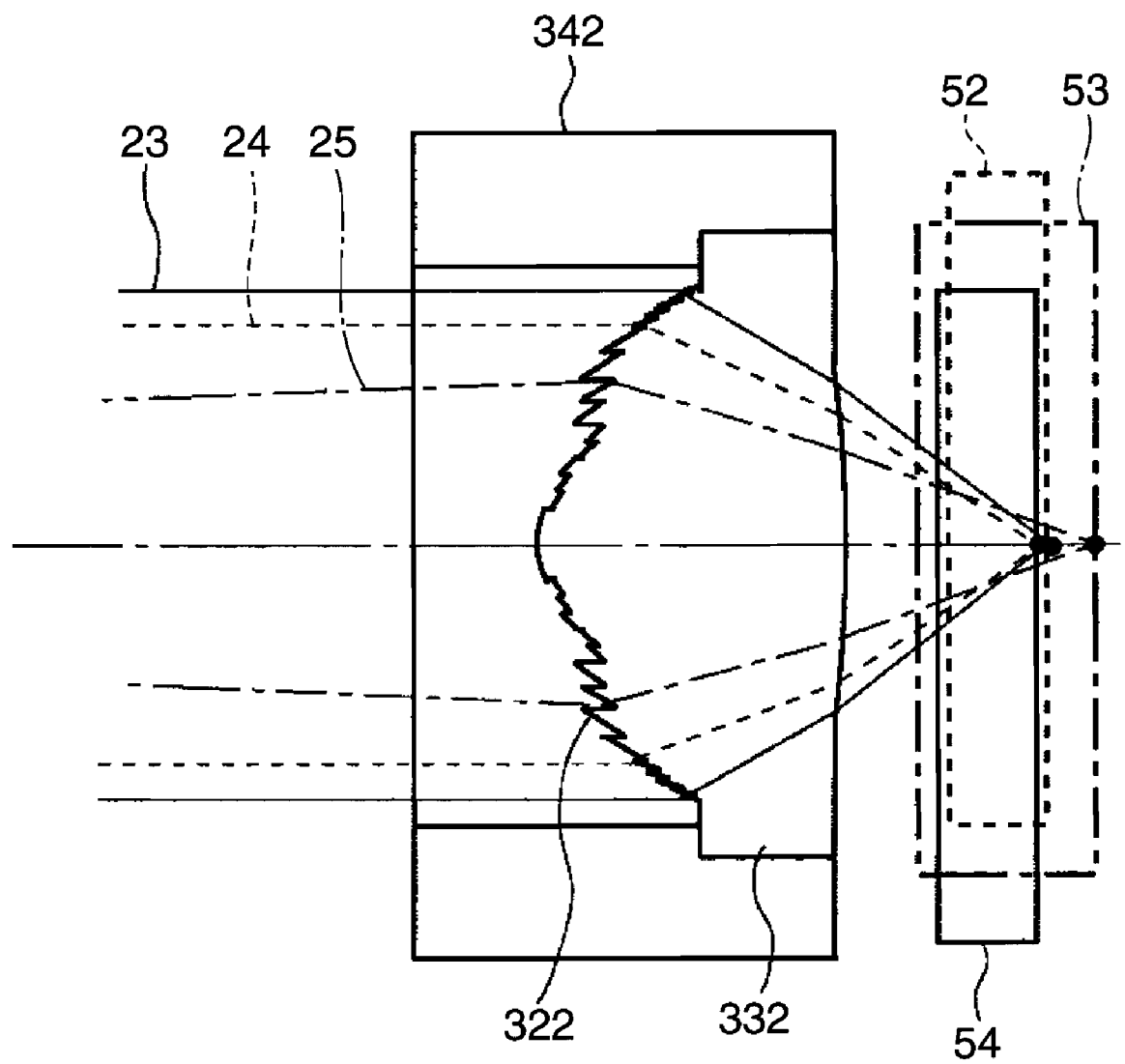
FIG. 19 is an enlarged cross section showing another modification of the objective lens according to the third embodiment of the invention.

Further, as in the same manner in the second embodiment above, by providing the phase shift pattern having the height ha, which is ten times the wavelength of the wavelength $\lambda 1$, to the diffraction element 32 or the refracting lens 33 shown in FIG. 15, it is possible to reduce spherical aberration when the wavelength changes from the design wavelength. FIG. 19 is an enlarged cross section showing another modification of the objective lens according to the third embodiment of the invention. Referring to FIG. 19, an objective lens 342 of this embodiment is formed of a refracting lens 332 on the surface of which a phase shift pattern and a diffraction element 322 are formed. The configuration and the action of the objective lens 342 are the same as those of the objective lens 145 shown in FIG. 12 and described in the second embodiment above. A detailed description is therefore omitted herein.

As has been described, according to the third embodiment, it is possible to set the numerical apertures suitable to the respective optical discs by correcting spherical aberration resulting from a difference in thickness of the protective layers in optical discs of different kinds using a double-wavelength light source. Also, it is possible to form the objective lens from a single molded lens, which makes it possible to achieve the stable converging performance at low costs.

Fourth Embodiment

Figure 20:
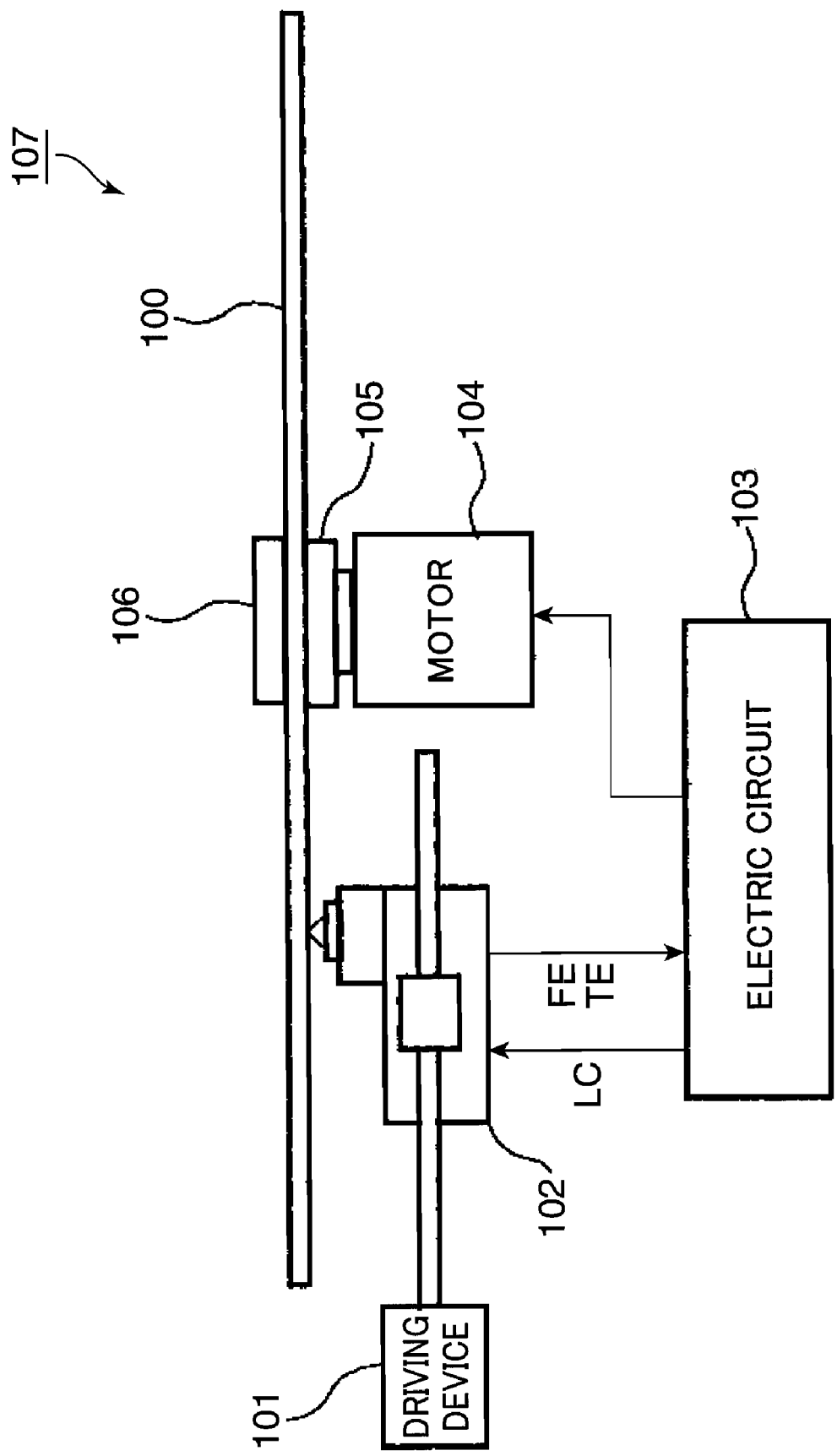
FIG. 20 is a cross section schematically showing the configuration of an optical disc device according to a fourth embodiment of the invention.

FIG. 20 is a cross section schematically showing an optical disc device according to a fourth embodiment of the invention. Referring to FIG. 20, an optical disc 100 is loaded on a turn table 105 and rotated by a motor 104. The optical head 102 illustrated and described in the first, second, or third embodiment above is transported to the track position of the optical disc 100 at which desired information is present by a driving device 101.

The optical head 102 sends a focus error signal FE and a tracking error signal TE to an electric circuit 103 corresponding to the positional relation with the optical disc 100. The electric circuit 103 sends a signal LC to the optical head 102 on the basis of these signals FE and TE so as to drive the objective lens within the optical head 102. The optical head 102 performs the focus control and the tracking control on the optical disc 100 according to the signal LC to read out, write in, or erase information.

In the description above, the optical disc 100 to be loaded is an optical disc having any one of the protective layer thicknesses t1, t2, and t3. Because the optical disc device 107 of this embodiment employs the optical head in any of the first, second, or third embodiment above, it is compatible with plural optical discs each having a different recoding density with the use of a single optical head.

Fifth Embodiment

Figure 21:
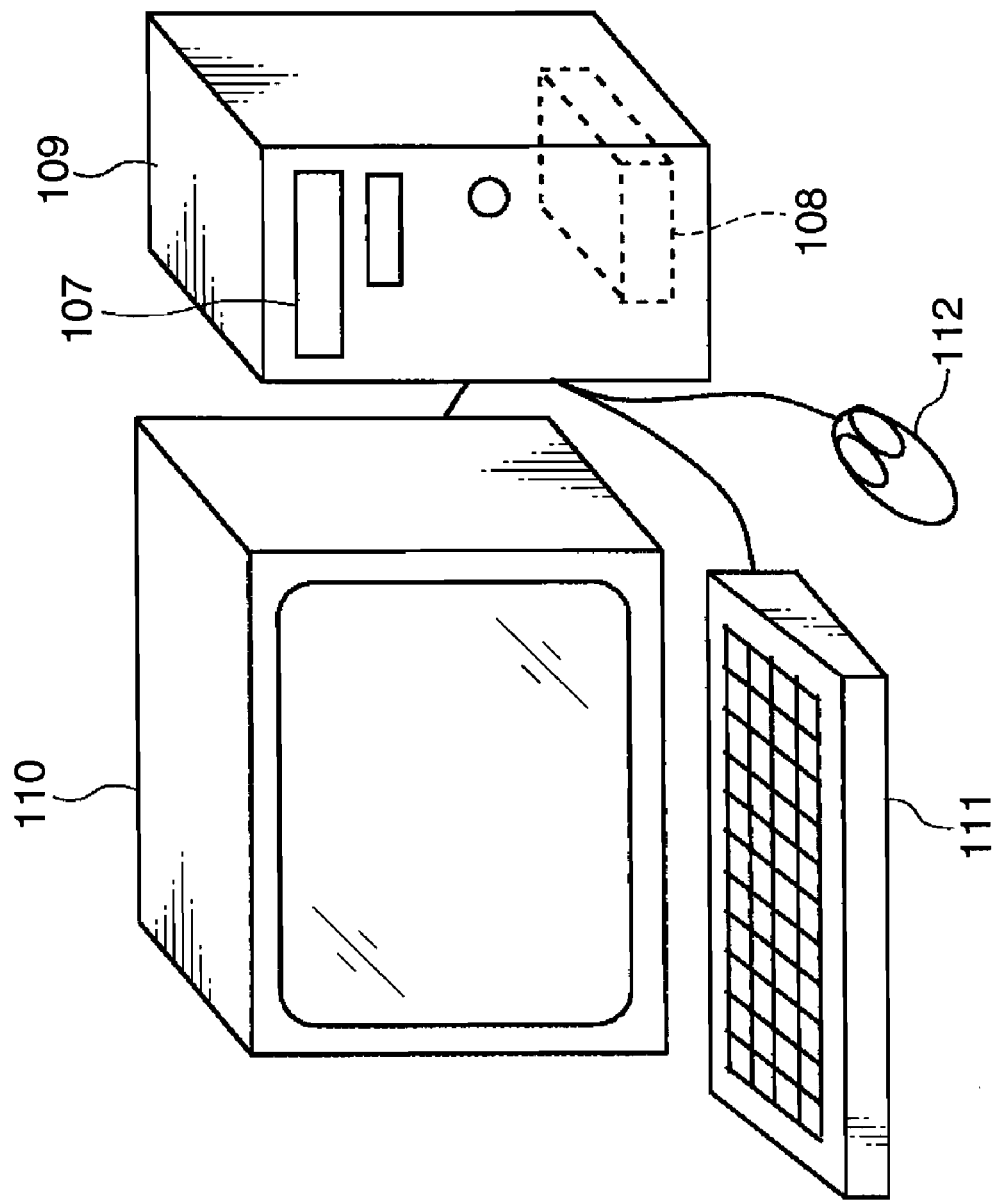
FIG. 21 is a perspective view schematically showing the configuration of a computer according to a fifth embodiment of the invention.

FIG. 21 is a perspective view schematically showing the configuration of a computer according to a fifth embodiment of the invention. Referring to FIG. 21, a computer 109 includes the optical disc device 107 of the fourth embodiment, input devices, such as a keyboard 111 and a mouse 112, to input information, a computation device 108, such as a CPU, that performs various kinds of computation according to the information inputted therein from the input devices and information read out from the optical disc device 107, and an output device 110, such as a cathode ray tube and a liquid crystal display, that displays information about the result of computation performed by the computation device 108.

The computer of this embodiment is provided with the optical disc device 107 of the fourth embodiment above. Hence, because information can be recorded in or played back from optical discs of different kinds in a stable manner, the computer fits for a wide range of uses.

Sixth Embodiment

Figure 22:
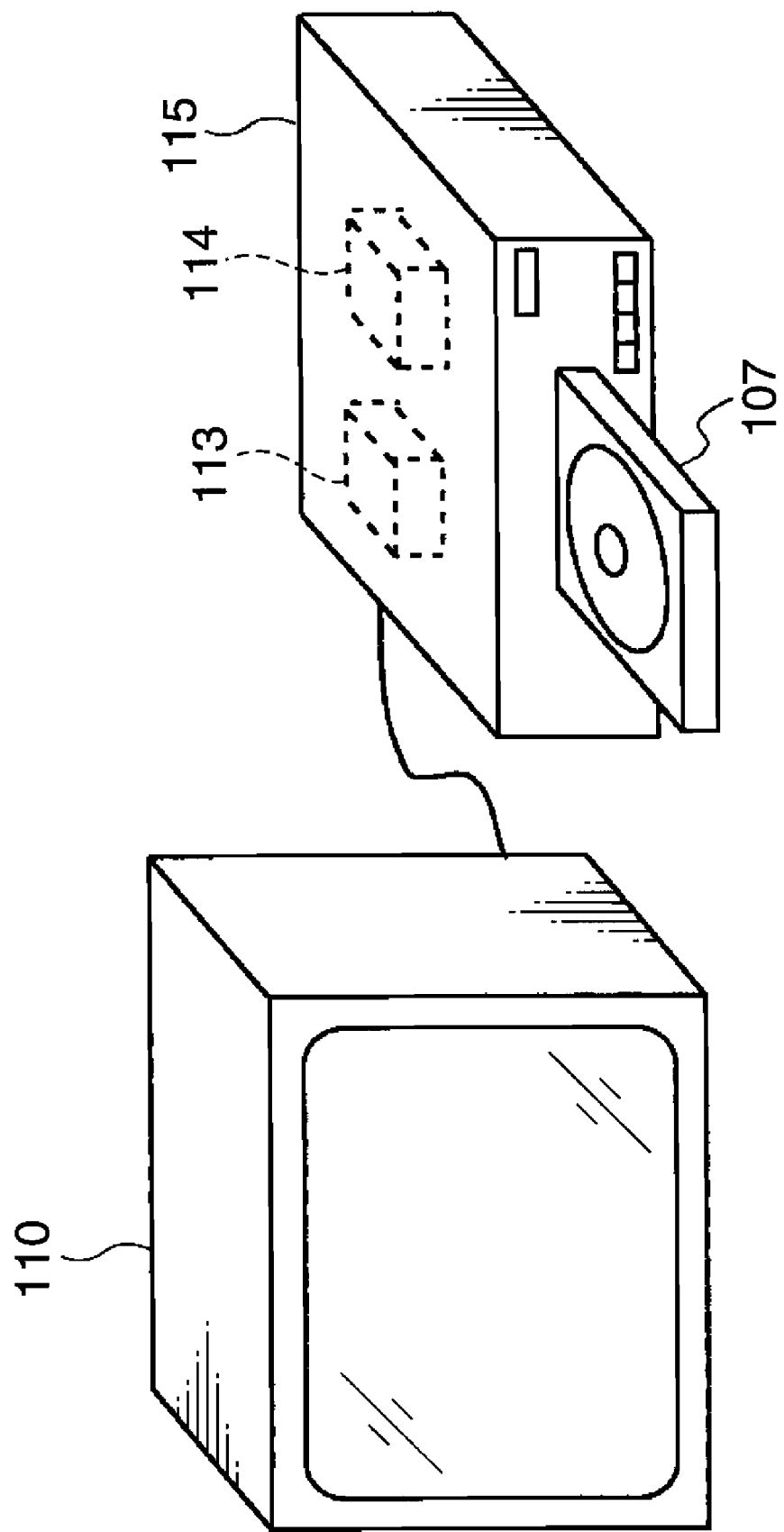
FIG. 22 is a perspective view schematically showing the configuration of an optical disc recorder according to a sixth embodiment of the invention.
Figure 23:
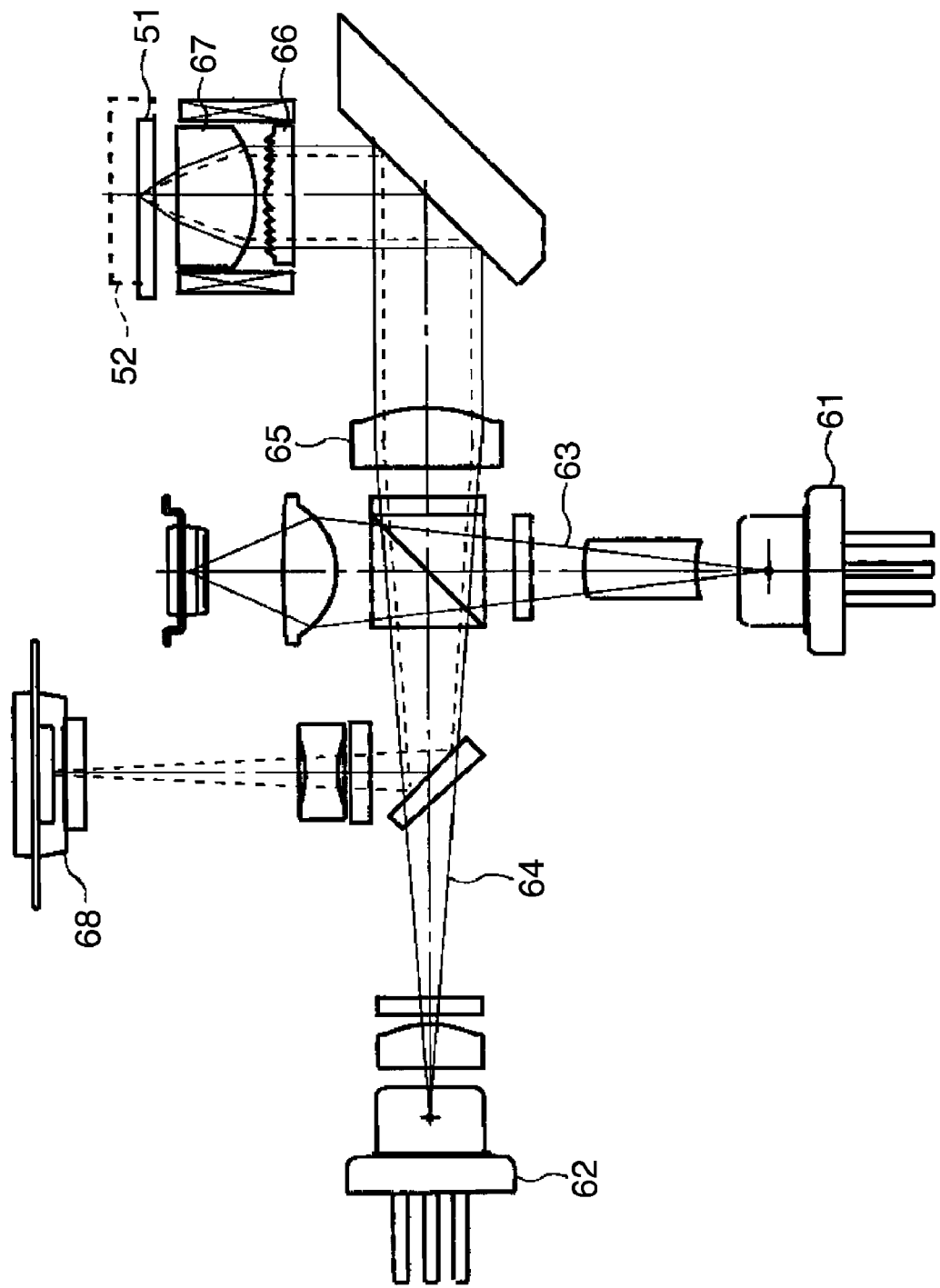
FIG. 23 is a cross section schematically showing the configuration of an example of an optical head device according to a first prior art.
Figure 24:
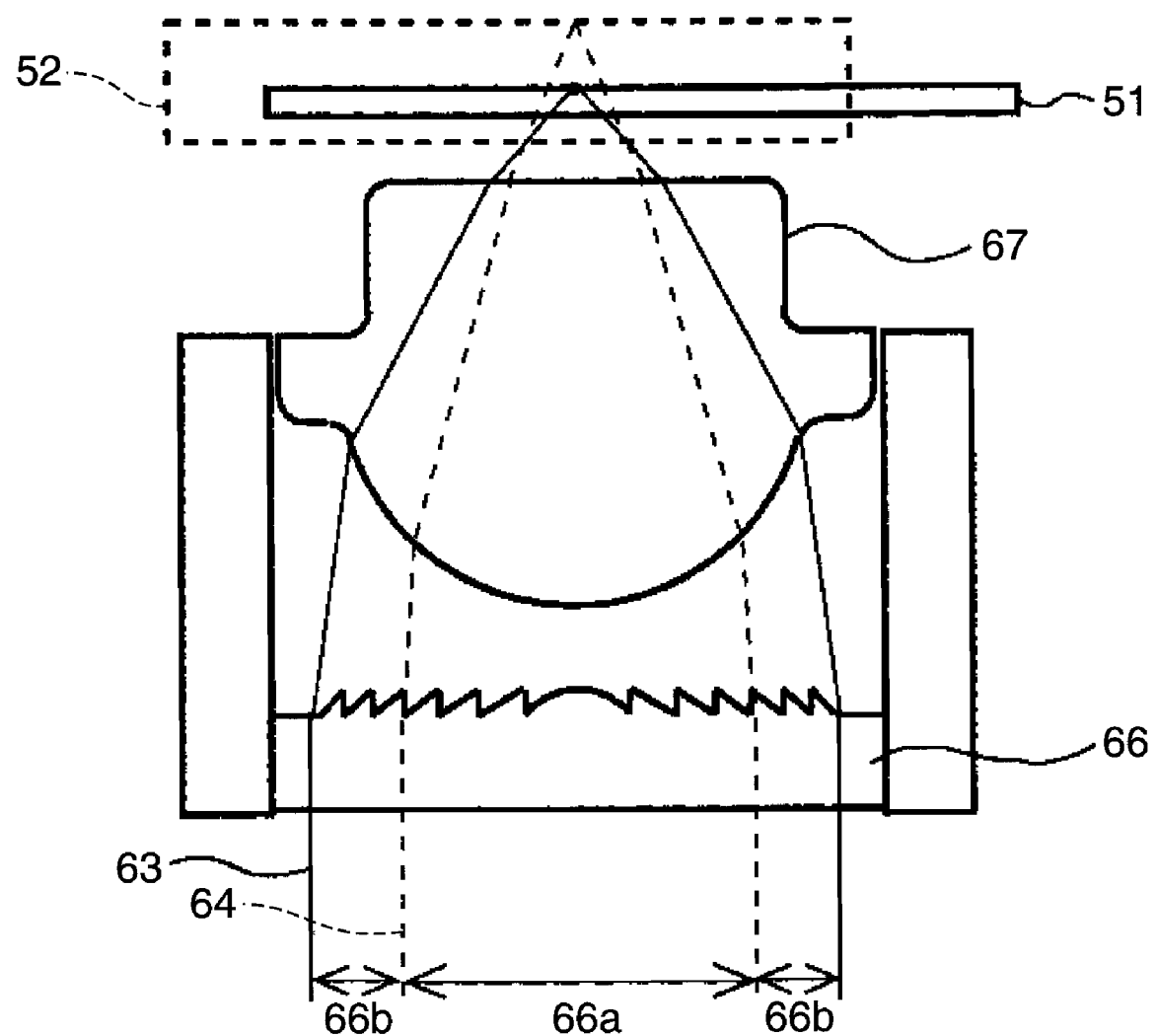
FIG. 24 is an enlarged cross section showing an example of an objective lens in the optical head device according to the first prior art.
Figure 25:
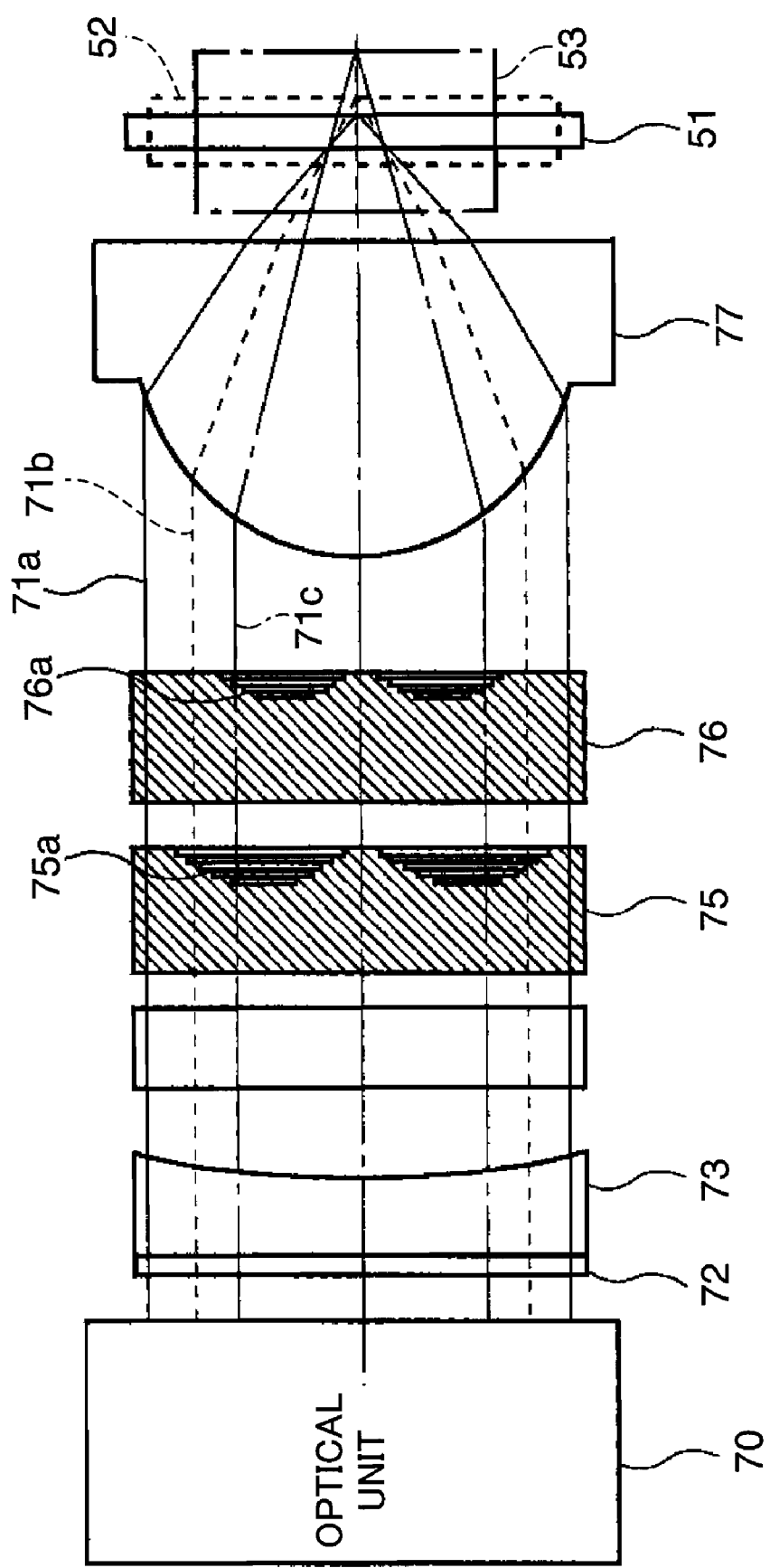
FIG. 25 is a cross section schematically showing the configuration of an example of an optical head device according to a second prior art.
Figure 26:
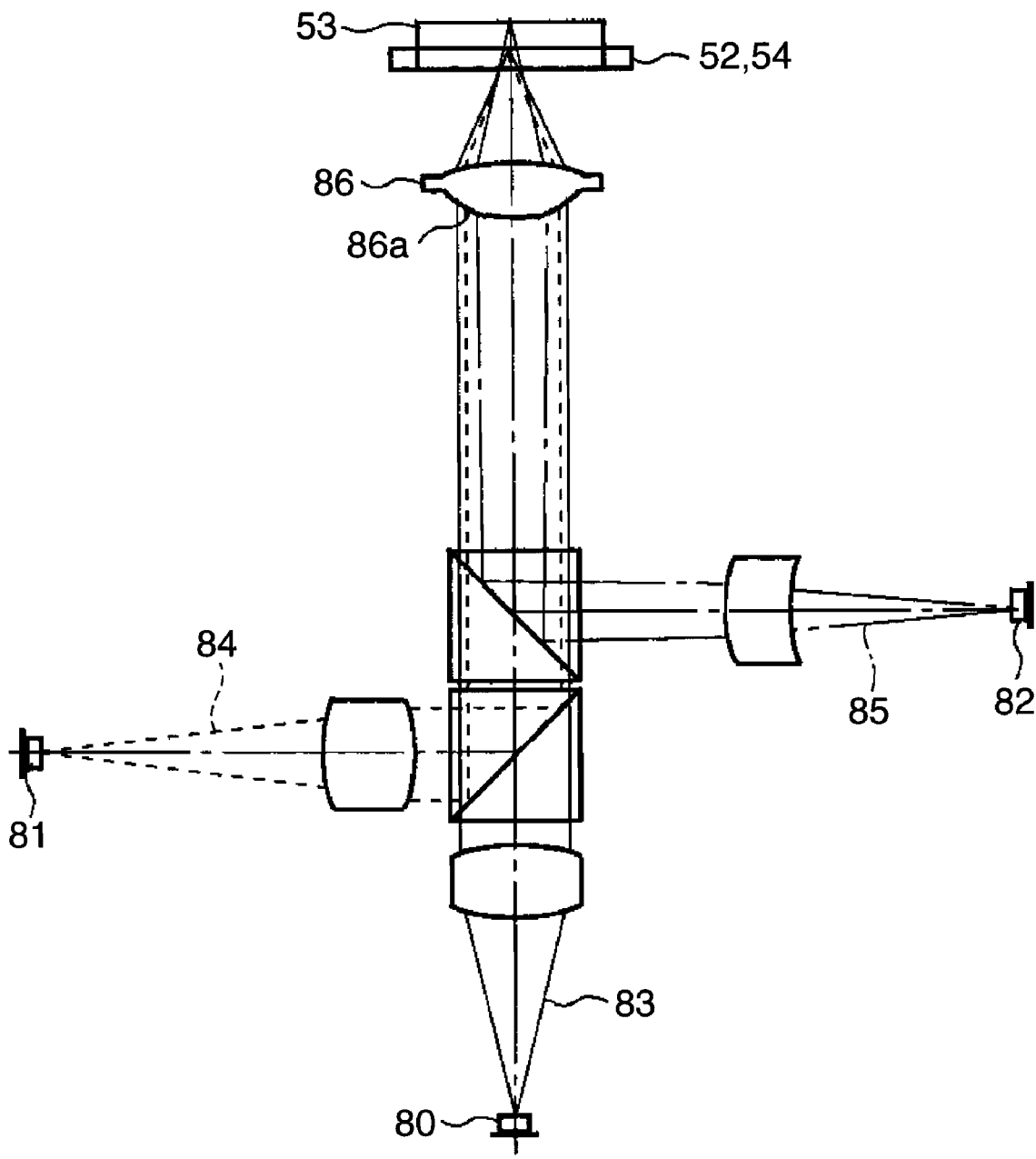
FIG. 26 is a cross section schematically showing the configuration of an example of an optical head device according to a fourth prior art.
Figure 27:
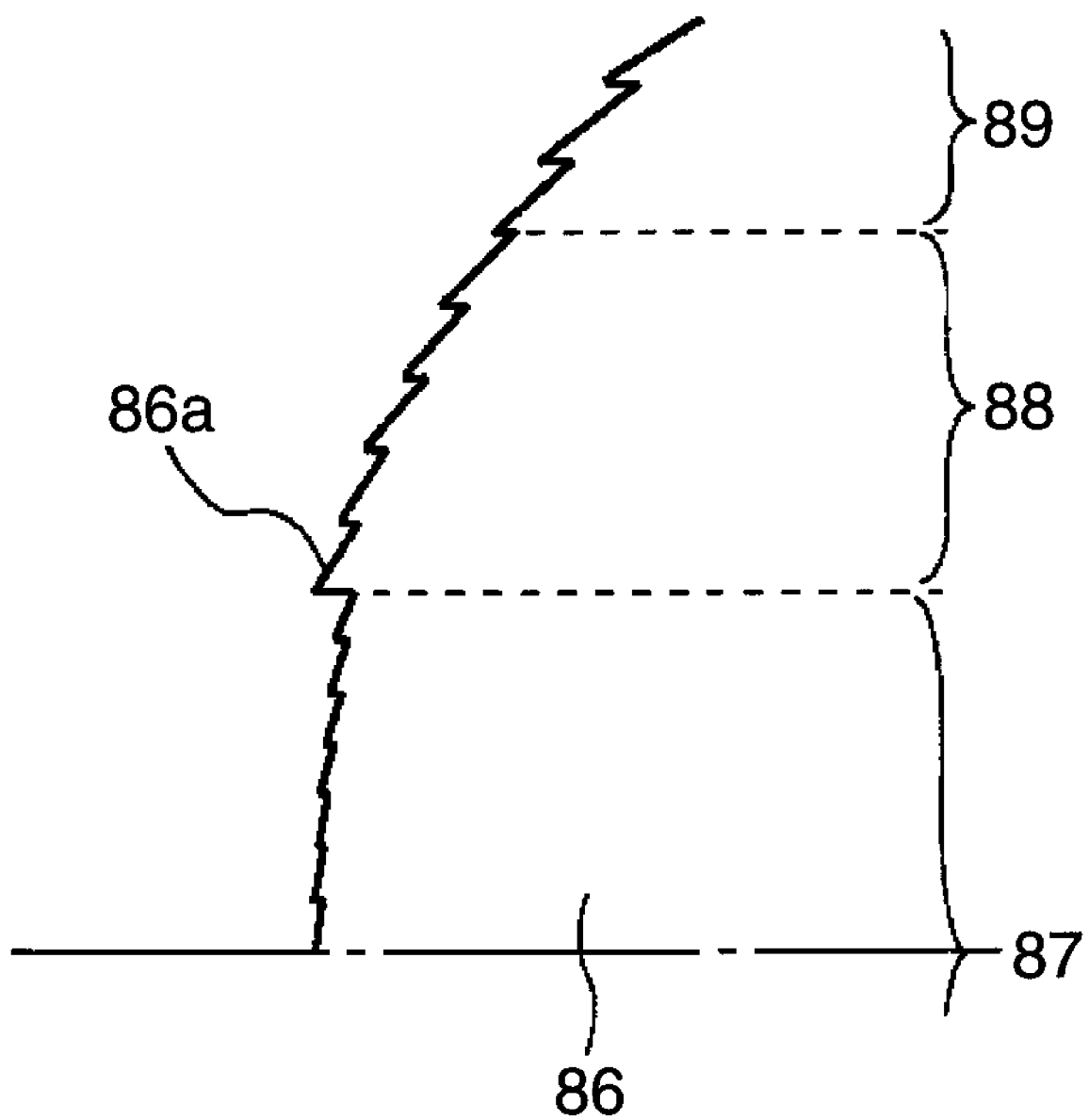
FIG. 27 is a partial enlarged cross section of a diffraction element in the optical head device according to the fourth prior art.

FIG. 22 is a perspective view schematically showing the configuration of an optical disc recorder according to a sixth embodiment of the invention. Referring to FIG. 22, an optical disc recorder 115 includes the optical disc device 107 of the fourth embodiment above, a recording signal processing circuit 113 that converts a video signal and/or a sound signal to a recording signal for an optical disc and sends the recording signal to the optical disc device, and a playback signal processing circuit 114 that converts a playback signal obtained from the optical disc device 107 to a video signal and/or a sound signal. According to this configuration, it is possible to play back a portion where information has been already recorded. Further, the optical disc recorder 115 may be provided with an output device 110 to display the information, such as a cathode ray tube and a liquid crystal display.

The optical disc recorder of this embodiment includes the optical disc device 107 of the fourth embodiment above. Hence, because information can be recorded in or played back from optical discs of different kinds in a stable manner, the optical recorder fits for a wide range of uses.

The characteristic configurations of the invention can be summarized as follows.

An optical head of the invention is characterized by including: a first light source for emitting light having a wavelength $\lambda 1$; a second light source for emitting light having a wavelength $\lambda 2$; a third light source for emitting light having a wavelength $\lambda 3$; an objective lens for converging the light having the wavelength $\lambda 1$ onto a first optical disc at a numerical aperture NA1, converging the light having the wavelength $\lambda 2$ onto a second optical disc at a numerical aperture NA2, and converging the light having the wavelength $\lambda 3$ onto a third optical disc at a numerical aperture NA3; and at least one light detector for detecting reflected light respectively from the first, second, and third optical discs, wherein the objective lens is formed of at least a diffraction element and a refracting lens and has numerical apertures in a relation expressed as: NA1>NA2>NA3, and wherein the diffraction element is formed of a diffraction grating having: a grating shape in a region corresponding to the numerical aperture NA3 that generates third-order diffracted light most strongly as the light having the wavelength $\lambda 1$ and converged onto the first optical disc, generates second-order diffracted light most strongly as the light having the wavelength $\lambda 2$ and converged onto the second optical disc, and generates second-order diffracted light most strongly as the light having the wavelength $\lambda 3$ and converged onto the third optical disc; a grating shape in a region corresponding to the numerical aperture NA3 to the numerical aperture NA2 that generates sixth-order diffracted light most strongly as the light having the wavelength $\lambda 1$ and converged onto the first optical disc, generates fourth-order diffracted light most strongly as the light having the wavelength $\lambda 2$ and converged onto the second optical disc, and generates third-order diffracted light most strongly for the light having the wavelength $\lambda 3$; and a grating shape in a region corresponding to the numerical aperture NA2 to the numerical aperture NA1 that generates m-th order diffracted light most strongly as the light having the wavelength $\lambda 1$ and converged onto the first optical disc.

According to this configuration, it is possible to converge the third-order diffracted light, the sixth-order diffracted light, and m-th order diffracted light of the light having the wavelength of $\lambda 1$ onto the first optical disc at the numerical aperture NA1, to converge the second-order diffracted light and the fourth-order diffracted light of light having the wavelength $\lambda 2$ onto the second optical disc at the numerical aperture NA2, and to converge the second-order diffracted light of the light having the wavelength $\lambda 3$ onto the third optical disc at the numerical aperture NA3 for recording/playing back information in a stable manner in/from the corresponding optical disc merely with the use of a single objective lens formed of the diffraction element and the refracting lens without the need to additionally provide aperture limiting means, such as an optical filter.

It is preferable for the optical head of the invention to further include a diffraction lens for diffracting the light having the wavelength $\lambda 2$ and the light having the wavelength $\lambda 3$.

According to this configuration, it is possible to set the numerical apertures for light beams going incident on the respective optical discs. Hence, in an optical system using the double-wavelength light source having the wavelength $\lambda 2$ and the wavelength $\lambda 3$, it is possible to make light having the wavelength $\lambda 3$ into divergent light, which is allowed to go incident on the objective lens.

It is preferable for the optical head of the invention that the diffraction lens is a convex lens having a diffracting action and a refracting action, and has a structure to provide a larger convex lens action to the light having the wavelength $\lambda 2$ than to the light having the wavelength $\lambda 3$.

According to this configuration, it is possible to correct spherical aberration generated in the protective layer of the third optical disc by making light having the wavelength $\lambda 3$ into divergent light.

It is preferable for the optical head of the invention that the objective lens is formed of the diffraction element, the refracting lens, and a phase shift pattern having plural steps that generate a phase difference in incident light, and the phase shift pattern has a structure in which a difference of optical path lengths generated when the light having the wavelength $\lambda 1$ passes through a depth of one step is ten times the wavelength $\lambda 1$.

According to this configuration, it is possible to suppress spherical aberration generated in the protective layer of the first optical disc when the wavelength $\lambda 1$ changes.

It is preferable for the optical head of the invention that the phase shift pattern is formed integrally with the diffraction element.

According to this configuration, it is possible to correct a change of the focal distance resulting from chromatic aberration by the diffraction element and to correct the spherical aberration resulting from chromatic aberration by the phase shift pattern with a compact and inexpensive configuration.

It is preferable for the optical head of the invention that the diffraction element is formed on a surface of the refracting lens.

According to this configuration, it is possible to achieve a compact and inexpensive objective lens having a satisfactory off-axis performance by eliminating displacement of the position between the diffraction element and the refracting lens.

It is preferable for the optical head of the invention that the phase shift pattern and the diffraction element are formed on a surface of the refracting lens.

According to this configuration, it is possible to achieve a compact and inexpensive objective lens capable of correcting a change of the focal distance resulting from chromatic aberration by the diffraction element and capable of correcting spherical aberration resulting from chromatic aberration by the phase shift pattern, and achieving a satisfactory off-axis performance by eliminating displacement of the position between the diffraction element and the refracting lens.

It is preferable for the optical head of the invention that thicknesses t1, t2, and t3 of the protective layers establish a relation expressed as: t1<t2<t3. It is also preferable that the thickness t1 of the protective layer is almost 0.1 mm, the thickness t2 of the protective layer is almost 0.6 mm, and the thickness t3 of the protective layer is almost 1.2 mm. It is further preferable that the numerical aperture NA1 is 0.85, the numerical aperture NA2 is 0.6, and the numerical aperture NA3 is 0.45 to 0.5.

According to these configurations, it is possible to record/play back information in/from a BD, a DVD, and a CD each having a protective layer of a different thickness with the use of a single objective lens.

Alternatively, it is preferable for the optical head of the invention that the thicknesses t1, t2, and t3 of the protective layers establish a relation expressed as: t1=t2<t3. It is also preferable that the thickness t1 of the protective layer is almost 0.6 mm, the thickness t2 of the protective layer is almost 0.6 mm, and the thickness t3 of the protective layer is almost 1.2 mm. It is further preferable that the numerical aperture NA1 is 0.65, the numerical aperture NA2 is 0.6, and the numerical aperture NA3 is 0.45 to 0.5.

According to these configurations, it is possible to record/play back information in/from an HD-DVD, a DVD, and a CD each having a protective layer of a different thickness with the use of a single objective lens.

It is preferable for the optical head of the invention that the diffraction grating forms concentric circles and has a saw-teeth cross sectional shape.

According to this configuration, it is possible to enhance the diffraction efficiency of light respectively having the wavelengths $\lambda 1$, $\lambda 2$, and $\lambda 3$.

It is preferable for the optical head of the invention that the diffraction grating has: a depth h1 that provides an optical path length of three or more wavelengths to the light having the wavelength $\lambda 1$ and an optical path length of two or less wavelengths to the light having the wavelength $\lambda 2$ in a region corresponding to the numerical aperture NA3, a depth h2 that provides an optical path length that is twice the depth h1 in a region corresponding to the numerical aperture NA3 to the numerical aperture NA2, and a depth h3 that provides an optical path length of m wavelengths to the light having the wavelength $\lambda 1$ in a region corresponding to the numerical aperture NA2 to the numerical aperture NA1; and different pitches in the respective regions in such a manner that the third-order diffracted light, the sixth-order diffracted light, and the m-th order diffracted light having the wavelength $\lambda 1$ are converged onto the first optical disc, the second-order diffracted light and the fourth-order diffracted light having the wavelength $\lambda 2$ are converged onto the second optical disc, and the second-order diffracted light having the wavelength $\lambda 3$ is converged onto the third optical disc.

According to this configuration, even when the diffraction orders of light are changed in plural regions in which the apertures are limited by the diffraction element, a change of the diffraction angle in response to a change of the wavelength becomes constant, which eliminates displacement of the position at which the light is converged onto the optical disc.

It is preferable for the optical head of the invention that an order m of the m-th order diffracted light is set to an integer other than multiples of 3.

According to this configuration, in a region of the diffraction element corresponding to the numerical apertures NA2 to NA1, because light respectively having the second and third wavelengths has no diffracted light to be converged onto the second and third optical discs, respectively, it is possible to limit the apertures.

It is preferable for the optical head of the invention that a pitch of the diffraction grating in the region of the diffraction element corresponding to the numerical apertures NA3 to NA2 is set to twice a pitch designed as the third-order diffracted light having the wavelength $\lambda 1$.

According to this configuration, a change of the diffraction angle in response to a change of the wavelength in the region corresponding to the numerical apertures NA3 to NA2 becomes the same as a change of the diffraction angle in response to a change of the wavelength in the region corresponding to the numerical aperture NA3.

It is preferable for the optical head of the invention that a pitch of the diffraction grating in the region of the diffraction element corresponding to the numerical apertures NA2 to NA1 is set to m/3 times a pitch designed as the third-order diffracted light having the wavelength $\lambda 1$.

According to this configuration, a change of the diffraction angle in response to a change of the wavelength in the region corresponding to the numerical apertures NA2 to NA1 becomes the same as a change of the diffraction angle in response to a change of the wavelength in the region corresponding to the numerical aperture NA3.

It is preferable for the optical head of the invention that the diffraction element has a convex lens action.

According to this configuration, by cancelling out chromatic aberration of the refracting lens with chromatic aberration of the diffraction element, it is possible to reduce a change of the focal length in response to a change of the wavelength.

In the optical head of the invention, the wavelength $\lambda 1$ is in the vicinity of 405 nm, the wavelength $\lambda 2$ is in the vicinity of 655 nm, and the wavelength $\lambda 3$ is in the vicinity of 780 nm.

An objective lens of the invention is characterized by being formed of the diffraction element and the refracting lens.

An optical disc device of the invention is characterized by including: the optical head of the invention; a motor for rotating the first, second, or third optical disc; and an electric circuit for controlling and driving at least any one of the motor, an optical lens included in the optical head, and the first, second, and third light sources according to a signal obtained from the optical head.

According to these configurations, because the optical head of the invention is included, the compatibility can be achieved among plural optical discs each having a different recording density.

A computer of the invention is characterized by including: the optical disc device of the invention; a computation device for performing a computation on the basis of at least either information inputted therein or information played back from the optical disc device; and an output device for outputting at least any one of the information inputted therein, the information played back from the optical disc device, and a result of the computation performed by the computation device.

According to this configuration, because the optical head of the invention is included, the computer is able to record or play back information in or from plural optical discs each having a different recording density in a stable manner. Hence, the computer fits to a broad range of uses.

An optical disc recorder of the invention is characterized by including: the optical disc device of the invention; a recording signal processing circuit for converting at least one of a video signal and a sound signal to a recording signal for the first, second, or third optical disc and sending the recording signal to the optical disc device; and a playback signal processing circuit for converting a playback signal obtained from the optical disc device to at least one of the video signal and the sound signal.

According to this configuration, because the optical disc device of the invention is included, the optical disc recorder is able to record or play back a video and/or a sound in or from plural optical discs each having a different recording density in a stable manner. Hence, the optical disc recorder fits to a broad range of uses.

INDUSTRIAL APPLICABILITY

The optical head of the invention is able to correct spherical aberration resulting from a difference in thickness of the protective layers in the respective discs with the use of a single objective lens without the need for aperture limiting means, such as an optical filter, and therefore has an advantage that stable compatible playback and compatible recording are enabled with discs of different kinds at low costs. The optical head is therefore useful when applied to devices, such as an optical disc device, a computer, and an optical disc recorder.

The invention claimed is:

1. An optical head, comprising:
a first light source for emitting light having a wavelength $\lambda 1$;
a second light source for emitting light having a wavelength $\lambda 2$;
a third light source for emitting light having a wavelength $\lambda 3$;
an objective lens for converging the light having the wavelength $\lambda 1$ onto a first optical disc at a numerical aperture NA1, converging the light having the wavelength $\lambda 2$ onto a second optical disc at a numerical aperture NA2, and converging the light having the wavelength $\lambda 3$ onto a third optical disc at a numerical aperture NA3; and
at least one light detector for detecting reflected light respectively from the first, second, and third optical discs,
wherein the objective lens is formed of at least a diffraction element and a refracting lens and has numerical apertures in a relation expressed as: NA1>NA2>NA3,
wherein the diffraction element is divided into an inner peripheral region corresponding to the numerical aperture NA3, an intermediate peripheral region corresponding to the numerical aperture NA3 to the numerical aperture NA2, and an outer peripheral region corresponding to the numerical aperture NA2 to the numerical aperture NA1, and is configured to differ diffraction orders of diffracted light that is generated most strongly in each of the inner peripheral region, the intermediate peripheral region, and the outer peripheral region, and
wherein the diffraction element is formed of a diffraction grating having:
a grating shape in the inner peripheral region that generates third-order diffracted light most strongly as the light having the wavelength $\lambda 1$ and converged onto the first optical disc, generates second-order diffracted light most strongly as the light having the wavelength $\lambda 2$ and converged onto the second optical disc, and generates second-order diffracted light most strongly as the light having the wavelength $\lambda 3$ and converged onto the third optical disc;
a grating shape in the intermediate peripheral region that generates sixth-order diffracted light most strongly as the light having the wavelength $\lambda 1$ and converged onto the first optical disc, generates fourth-order diffracted light most strongly as the light having the wavelength $\lambda 2$ and converged onto the second optical disc, and generates third-order diffracted light most strongly for the light having the wavelength $\lambda 3$; and
a grating shape in the outer peripheral region that generates m-th order diffracted light most strongly as the light having the wavelength $\lambda 1$ and converged onto the first optical disc.

2. The optical head according to claim 1, further comprising:
a diffraction lens for diffracting the light having the wavelength $\lambda 2$ and the light having the wavelength $\lambda 3$.

3. The optical head according to claim 2, wherein:
the diffraction lens is a convex lens having a diffracting action and a refracting action, and has a structure to provide a larger convex lens action to the light having the wavelength $\lambda 2$ than to the light having the wavelength $\lambda 3$.

4. The optical head according to claim 1, wherein:
the objective lens is formed of the diffraction element, the refracting lens, and a phase shift pattern having plural steps that generate a phase difference in incident light, and the phase shift pattern has a structure in which a difference of optical path lengths generated when the light having the wavelength $\lambda 1$ passes through a depth of one step is ten times the wavelength $\lambda 1$.

5. The optical head according to claim 4, wherein:
the phase shift pattern is formed integrally with the diffraction element.

6. The optical head according to claim 1, wherein:
the diffraction element is formed on a surface of the refracting lens.

7. The optical head according to claim 4, wherein:
the phase shift pattern and the diffraction element are formed on a surface of the refracting lens.

8. The optical head according to claim 1, wherein:
thicknesses t1, t2, and t3 of protective layers of the first, second, and third optical discs establish a relation expressed as: t1<t2<t3.

9. The optical head according to claim 8, wherein:
the thickness t1 of the protective layer is almost 0.1 mm, the thickness t2 of the protective layer is almost 0.6 mm, and the thickness t3 of the protective layer is almost 1.2 mm.

10. The optical head according to claim 9, wherein:
the numerical aperture NA1 is 0.85, the numerical aperture NA2 is 0.6, and the numerical aperture NA3 is 0.45 to 0.5.

11. The optical head according to claim 1, wherein:
thicknesses t1, t2, and t3 of protective layers of the first, second, and third optical discs establish a relation expressed as: t1=t2<t3.

12. The optical head according to claim 11, wherein:
the thickness t1 of the protective layer is almost 0.6 mm, the thickness t2 of the protective layer is almost 0.6 mm, and the thickness t3 of the protective layer is almost 1.2 mm.

13. The optical head according to claim 12, wherein:
the numerical aperture NA1 is 0.65, the numerical aperture NA2 is 0.6, and the numerical aperture NA3 is 0.45 to 0.5.

14. The optical head according to claim 1, wherein:
the diffraction grating forms concentric circles and has a saw-teeth cross sectional shape.

15. The optical head according to claim 1, wherein the diffraction grating has:
a depth h1 that provides an optical path length of three or more wavelengths to the light having the wavelength λ1 and an optical path length of two or less wavelengths to the light having the wavelength λ2 in the inner peripheral region,
a depth h2 that provides an optical path length that is twice the depth h1 in the intermediate peripheral region, and
a depth h3 that provides an optical path length of m wavelengths to the light having the wavelength λ1 in the outer peripheral region; and
wherein the diffraction grating has different pitches in the respective regions in such a manner that the third-order diffracted light, the sixth-order diffracted light, and the m-th order diffracted light having the wavelength λ1 are converged onto the first optical disc, the second-order diffracted light and the fourth-order diffracted light having the wavelength λ2 are converged onto the second optical disc, and the second-order diffracted light having the wavelength λ3 is converged onto the third optical disc.

16. The optical head according to claim 1, wherein:
an order m of the m-th order diffracted light is set to an integer other than multiples of 3.

17. The optical head according to claim 1, wherein:
a pitch of the diffraction grating in the intermediate peripheral region of the diffraction element is set to twice a pitch designed as the third-order diffracted light having the wavelength λ1.

18. The optical head according to claim 1, wherein:
a pitch of the diffraction grating in the outer peripheral region of the diffraction element is set to m/3 times a pitch designed as the third-order diffracted light having the wavelength λ1.

19. The optical head according to claim 1, wherein:
the diffraction element has a convex lens action.

20. The optical head according to claim 1, wherein:
the wavelength λ1 is in the vicinity of 405 nm, the wavelength λ2 is in the vicinity of 655 nm, and the wavelength λ3 is in the vicinity of 780 nm.

21. An objective lens, being formed of the diffraction element and the refracting lens set forth in claim 1.

22. An optical disc device, comprising:
the optical head set forth in claim 1;
a motor for rotating the first, second, or third optical disc; and
an electric circuit for controlling and driving at least any one of the motor, an optical lens included in the optical head, and the first, second, and third light sources according to a signal obtained from the optical head.

23. A computer, comprising:
the optical disc device set forth in claim 22;
a computation device for performing a computation on the basis of at least either information inputted therein or information played back from the optical disc device; and
an output device for outputting at least any one of the information inputted therein, the information played back from the optical disc device, a result of the computation performed by the computation device.

24. An optical disc recorder, comprising:
the optical disc device set forth in claim 22;
a recording signal processing circuit for converting at least one of a video signal and a sound signal to a recording signal for the first, second, or third optical disc and sending the recording signal to the optical disc device; and
a playback signal processing circuit for converting a playback signal obtained from the optical disc device to at least one of the video signal and the sound signal.

* * * * *